US012263477B2

(12) United States Patent
Weinberger et al.

(10) Patent No.: US 12,263,477 B2
(45) Date of Patent: Apr. 1, 2025

(54) OPTO-FLUIDIC ARRAY FOR RADICAL PROTEIN FOOT-PRINTING

(71) Applicant: GenNext Technologies, Inc., Half Moon Bay, CA (US)

(72) Inventors: Scot Randy Weinberger, Montara, CA (US); Robert Wallace Egan, Reno, NV (US); Jeffrey Johnathan Persoff, San Jose, CA (US); Emily Elizabeth Chea, Pacifica, CA (US); Tan Huu Bui, San Mateo, CA (US); David Allan Holman, Albany, CA (US)

(73) Assignee: GENNEXT TECHNOLOGIES, INC., Half Moon Bay, CA (US)

( * ) Notice: Subject to any disclaimer, the term of this patent is extended or adjusted under 35 U.S.C. 154(b) by 716 days.

(21) Appl. No.: 17/532,806

(22) Filed: Nov. 22, 2021

(65) Prior Publication Data

US 2022/0080418 A1    Mar. 17, 2022

Related U.S. Application Data

(63) Continuation-in-part of application No. 17/193,913, filed on Mar. 5, 2021, now Pat. No. 11,181,529, (Continued)

(51) Int. Cl.
*B01L 3/00* (2006.01)
*G01N 21/63* (2006.01)
*G01N 21/64* (2006.01)

(52) U.S. Cl.
CPC ... *B01L 3/502715* (2013.01); *B01L 3/502707* (2013.01); *B01L 3/50273* (2013.01); (Continued)

(58) Field of Classification Search
CPC .............. G01N 33/68; G01N 33/6803; G01N 33/6848; G01N 21/6428; G01N 21/33;
(Continued)

(56) References Cited

U.S. PATENT DOCUMENTS 2,987,456 A    6/1961   Lauer
3,354,315 A   11/1967   Preston et al.
(Continued)

FOREIGN PATENT DOCUMENTS

EP    0347039 A3    12/1989
GB    2358244 A      7/2001
(Continued)

OTHER PUBLICATIONS

JP2023-537510, Notification of Reasons for Refusal, Mailed Jun. 18, 2024.
(Continued)

*Primary Examiner* — Maureen Wallenhorst
(74) *Attorney, Agent, or Firm* — Rimon Law, P.C.

(57) ABSTRACT

Systems and methods of in vivo and in vitro radical protein foot-printing using an opto-fluidic array are presented. These teachings may be used to, for example, study three-dimensional protein structure or bio-kinetics. Radical dosimetry including an optional intrinsic standard is used. Real-time feedback based on an internal standard provides comparability between different experiments and in vivo and in vitro analysis results in data that is representative of actual biological conditions.

16 Claims, 12 Drawing Sheets

Related U.S. Application Data which is a continuation-in-part of application No. PCT/US2020/012430, filed on Jan. 6, 2020, and a continuation-in-part of application No. PCT/US2019/057059, filed on Oct. 18, 2019, said application No. PCT/US2020/012430 is a continuation-in-part of application No. 16/316,006, filed on Jan. 7, 2019, now Pat. No. 10,816,468, said application No. PCT/US2019/057059 is a continuation-in-part of application No. 16/316,006, filed on Jan. 7, 2019, now Pat. No. 10,816,468.

(60) Provisional application No. 63/128,439, filed on Dec. 21, 2020, provisional application No. 62/788,219, filed on Jan. 4, 2019, provisional application No. 62/747,247, filed on Oct. 18, 2018.

(52) U.S. Cl.
CPC ....... *G01N 21/631* (2013.01); *G01N 21/6486* (2013.01); *B01L 2200/12* (2013.01); *B01L 2200/16* (2013.01); *B01L 2300/0663* (2013.01); *B01L 2300/0819* (2013.01); *B01L 2300/0867* (2013.01); *B01L 2300/087* (2013.01); *B01L 2300/0883* (2013.01); *B01L 2300/0887* (2013.01); *B01L 2400/0478* (2013.01); *G01N 2201/0612* (2013.01)

(58) Field of Classification Search
CPC ............. G01N 21/631; G01N 21/6486; G01N 2201/0612; Y10T 436/203332; Y10T 436/2575; B01L 3/502715; B01L 3/502707; B01L 3/50273; B01L 2200/12; B01L 2200/16; B01L 2300/0663; B01L 2300/0819; B01L 2300/0867; B01L 2300/087; B01L 2300/0883; B01L 2300/0887; B01L 2400/0478
USPC .................. 436/86, 89, 164, 172, 180, 131; 422/82.05, 82.08, 82.09, 502, 503
See application file for complete search history.

(56) References Cited

U.S. PATENT DOCUMENTS

| | | | |
|---|---|---|---|
| 4,000,973 | A | 1/1977 | Petersen |
| 5,021,646 | A | 6/1991 | Weinberger et al. |
| 5,037,100 | A | 8/1991 | Hlousek |
| 5,037,523 | A | 8/1991 | Weinberger et al. |
| 5,443,791 | A | 8/1995 | Cathcart et al. |
| 5,602,446 | A | 2/1997 | Kolber et al. |
| 5,807,750 | A | 9/1998 | Baum et al. |
| 5,936,728 | A | 8/1999 | Bouzid |
| 6,254,689 | B1 | 7/2001 | Meder |
| 6,741,347 | B1 | 5/2004 | Scaiano et al. |
| 7,812,311 | B2 | 10/2010 | DeCamp et al. |
| 7,817,270 | B2 | 10/2010 | Gusev |
| 8,446,587 | B2 | 5/2013 | Gusev |
| 9,279,814 | B2 | 3/2016 | Brenowitz et al. |
| 10,816,468 | B2 | 10/2020 | Weinberger et al. |
| 10,851,335 | B2 | 12/2020 | Jones et al. |
| 11,181,529 | B2 * | 11/2021 | Weinberger .......... G01N 21/631 |
| 12,013,400 | B2 * | 6/2024 | Weinberger ........ G01N 21/6428 |
| 12,013,401 | B2 * | 6/2024 | Weinberger ............ G01N 21/59 |
| 12,016,688 | B2 * | 6/2024 | Weinberger .......... A61B 5/1455 |
| 2002/0033369 | A1 | 3/2002 | Bender |
| 2003/0036206 | A1 | 2/2003 | Chien et al. |
| 2003/0074062 | A1 | 3/2003 | Monzyk |
| 2004/0241872 | A1 | 12/2004 | Wegrzyn et al. |
| 2005/0218082 | A1 | 10/2005 | Williamson et al. |
| 2005/0266065 | A1 | 12/2005 | Perrier et al. |
| 2006/0257877 | A1 | 11/2006 | Anderle |
| 2007/0152154 | A1 | 7/2007 | DeCamp et al. |
| 2008/0165363 | A1 | 7/2008 | Gusev |
| 2009/0074611 | A1 | 3/2009 | Monzyk et al. |
| 2010/0081159 | A1 | 4/2010 | Ledebeva et al. |
| 2010/0137163 | A1 | 6/2010 | Link et al. |
| 2013/0119277 | A1 | 5/2013 | Atzler et al. |
| 2014/0030751 | A1 | 1/2014 | Sharp |
| 2018/0079998 | A1 | 3/2018 | Jones et al. |

FOREIGN PATENT DOCUMENTS

| | | |
|---|---|---|
| JP | 2009192259 A | 8/2009 |
| WO | 2007/081387 A1 | 7/2007 |
| WO | 2016/130553 A1 | 8/2016 |
| WO | 2016/164244 A1 | 10/2016 |
| WO | 2018/218163 A1 | 11/2018 |
| WO | 2020/142785 A1 | 7/2020 |
| WO | 2020/146425 A1 | 7/2020 |

OTHER PUBLICATIONS

Zhang, H., et al., Fast photochemical oxidation of proteins for comparing structures of protein-ligand complexes: the calmodulin-peptide model system. Anal Chem, 2011. 83(1): p. 311-8.

Johnson, D.T., L.H. Di Stefano, and L.M. Jones, Fast photochemical oxidation of proteins(FPOP): A powerful mass spectrometry based structural proteomics tool. J Biol Chem, 2019.

Espino, J.A. and L.M. Jones, Illuminating Biological Interactions with in Vivo Protein Footprinting. Anal Chem, 2019. 91(10): p. 6577-6584.

Chea E.E. and L.M. Jones, Modifications generated by fast photochemical oxidation of proteins reflect the native conformations of proteins. Protein Sci, 2018. 27(6): p. 1047-1056.

Chea, E.E. and L.M. Jones, Analyzing the structure of macromolecules in their native cellular environment using hydroxyl radical footprinting. Analyst, 2018. 143(4): p. 798-807.

Aprahamian, M.L., et al., Rosetta Protein Structure Prediction from Hydroxyl Radical Protein Footprinting Mass Spectrometry Data. Anal Chem, 2018. 90(12): p. 7721-7729.

Rinas, A., et al., Development of a Microflow System for In-Cell Footprinting Coupled with Mass Spectrometry. Anal Chem, 2016. 88(20): p. 10052-10058.

Rinas, A., J.A. Espino, and L.M. Jones, An efficient quantitation strategy for hydroxyl radical-mediated protein footprinting using Proteome Discoverer. Anal Bioanal Chem, 2016. 408(11): p. 3021-31.

Rinas, A. and L.M. Jones, Fast photochemical oxidation of proteins coupled to multidimensional protein identification technology (MudPIT): expanding footprinting strategies to complex systems. J Am Soc Mass Spectrom, 2015. 26(4): p. 540-6.

Espino, J.A., V.S. Mali, and L.M. Jones, In Cell Footprinting Coupled with Mass Spectrometry for the Structural Analysis of Proteins in Live Cells. Anal Chem, 2015. 87(15): p. 7971-7978.

Jones, L.M., et al., Fast photochemical oxidation of proteins for epitope mapping. Anal Chem, 2011. 83(20): p. 7657-61.

Poor, T.A., et al., Probing the paramyxovirus fusion (F) protein-refolding event from pre- to postfusion by oxidative footprinting. Proc Natl Acad Sci U S A, 2014. 111(25): p. E2596-605.

Jones, L.M., et al., Complementary MS methods assist conformational characterization of antibodies with altered S-S bonding networks. J Am Soc Mass Spectrom, 2013. 24(6): p. 835-45.

Cong, M. et al., Research on a Novel R-0 Wafer Handling Robot, Aug. 2007, 2007 IEEE International Conference on Automation and Logistics, pp. 597-602 (Year: 2007).

Sharp, et al., Real Time Normalization of Fast Photochemical Oxidation of Proteins Experiments by Inline Adenine Radical Dosimetry, Analytical Chemistry, vol. 90, pp. 12625-12630, Oct. 5, 2018.

Roush, et al., Intrinsic Buffer Hydroxyl Radical Dosimetry Using Tris(Hydroxymethyl)Aminomethane, bioRxiv, pp. 1-6, Oct. 19, 2019.

PCT/US2019/057059, International Search Report and Written Opinion, mailed Dec. 31, 2019.

(56) References Cited

OTHER PUBLICATIONS

PCT/US2020/012430, International Search Report and Written Opinion, mailed Mar. 12, 2020.
EP 18805903.4, Extended European Search Report, mailed Jan. 29, 2021.
EP 18805903.4, Response to Extended European Search Report, mailed Jan. 29, 2021, filed Jun. 9, 2021.
EP 18805903.4, First Examination Report, mailed Oct. 21, 2021.
EP 18805903.4, Response to First Examination Report, mailed Oct. 21, 2021, filed Jan. 26, 2022.
EP 23172498.0, Extended European Search Report, mailed Jul. 3, 2023.
EP 18805903.4, Response to Extended European Search Report, mailed Jan. 29, 2021, filed Sep. 25, 2023.
EP 20735970.4, Extended European Search Report, mailed Sep. 9, 2022.
EP 20735970.4, Response to Extended European Search Report, mailed Sep. 9, 2022, filed Mar. 27, 2023.
JP2021-539578, Office Action, mailed Oct. 31, 2023 plus translation.
PCT/US2021/060394, International Search Report and Written Opinion, mailed Mar. 24, 2022.
JP2021-539578, Argument and Amendment filed in response to Office Action, mailed Oct. 31, 2023, filed Mar. 12, 2024, plus translation.
Xu et al., "Hydroxyl radical-mediated modification of proteins as probes for structural proteomics", Chemical Reviews, 2007, vol. 107, No. 8, pp. 3514-3543.
Takamoto et al., "Radiolytic protein footprinting with mass spectrometry to probe the structure of macromolecular complexes", Annu. Rev. Biophys. Biomol Struct. 2006, 35:251-76.
Niu et al., "Dosimetry determines the inital OH radical concentration in fast photochemical oxidation of proteins (FPOP)", J. Am. Soc. Mass Spectrom. (2015) 26:843-846.
U.S. Appl. No. 13/951,708, Final Rejection dated Feb. 10, 2015.
Gau et al., "Fast photochemical oxidation of protein footprints faster than protein unfolding", Anal. Chem. 2009, 81, 6563-6571.
U.S. Appl. No. 11/970,676, Non-final Office Action dated Apr. 1, 2009.
Hambly et al. Laser flash photolysis of hydrogen peroxide to oxidize protein solvent-accessible residues on the microsecond timescale:, J Am Soc Mass Spectrom 2005, 16, 2057-2063.
Scaiano, Dr. J.C., "Laser Flash Photolysis: From Lindqvist to Luzchem", technical report No. 001, Luzchem Research, Inc., Ottawa, Canada, Aug. 2003.
Vahidi, et al., "Probing the time scale of FPOP (fast photochemical oxidation of proteins): radical reactions extend over tens of milliseconds", J. Am. Soc. Mass Spectrom. (2016) 27:1156-1164.
Li, et al., "High Structural Resolution Hydroxyl Radical Protein Footprinting Reveals an Extended Robo1-Heparin Binding Interface" JBC Papers in Press. Published on Mar. 9, 2015 as Manuscript M115.648410.
Wang, et al. "Oligomeric Structure of the Chemokine CCL5/RANTES from NMR, MS, and SAXS Data", Structure 19, 1138-1148, Aug. 10, 2011.
Li, et al., "Structural analysis of the glycosylated intact HIV-1 gp120-b12 antibody complex using hydroxyl radical protein footprinting", Biochemistry 2017, 56, 957-970.
Watson, et al., "Conformational analysis of therapeutic proteins by hydroxyl radical protein footprinting", the AAPS Journal, vol. 14, No. 2, Jun. 2012.
Xie, et al., "Hydroxyl radical dosimetry for high flux hydroxyl radical protein footprinting applications using a simple optical detection method", Anal. Chem. 2015, 87, 10719-10723.
Sharp, et al., "Analysis of protein solvent accessible surfaces by photochemical oxidation and mass spectrometry", Anal. Chem. 2004 76, 672-683.
Huang, et al., "An approach for separation and complete structural sequencing of Heparin/Heparin sulfate-like Oligosaccharides", 2013 Anal. Chem. 85 5787-5795.
Li, et al. "Improved identification and relative quantification of sites of peptide and protein oxidation for hydroxyl radical footprinting", 2013 J. Am Soc. Mass Spectrom.24 1767-1776.
Wang, et al., "Chemokine oligomerization in cell signaling and migration", Prog. Mol. Bioil. Transf. Sci. 117: 531-578.
Saladino, et al., "Aliphatic Peptidyl Hydroperoides as a source of secondary oxidation in hydroxyl radical protein footprinting", 2009 J. Am Soc. Mass Spectrom.20 1123-1126.
Watson, et al., Pulsed electron beam water radiolysis for submicrosecond hydroxyl radical protein footprinting:, 2009 Anal. Chem. 81, 2496-2505.
Bern, et al., "Conversion of methionine into homocysteic acid in heavily oxidized proteomics samples", Rapid. Commun. Mass Spectrom, 2010, 24, 768-772.
Charvatova, et al., "Quantifying protein interface footprinting by hydroxyl radical oxidation and molecular dynamics simulation: application to galectin-1", J. Am. Soc. Mass Spectrom, 2008, 19: 1692-1705.
Smedley, et al., "Probing the pH-dependent prepore to pore transition of bacillus anthracis protective antigen with differential oxidative protein footprinting", Biochemistry 2008, 47, 10694-10704.
U.S. Appl. No. 13/951,708, SB08 Form filed Oct. 21, 2014.
JP2023-537510, Amendment and Argument filed in response to Notification of Reasons for Refusal, mailed Jun. 18, 2024, filed Sep. 13, 2024.
EP 21911852.8, Extended European Search Report, mailed Sep. 30, 2024.

\* cited by examiner

FIG. 7

| Fluorescent Dosimeter | Cellular Compartment | Excitation Wavelength (nm) | Emission Wavelength (nm) |
|---|---|---|---|
| Terepthalic Acid | Cytoplasm | 312 | 426 |
| CellROX® Green | Nucleus; Mitochondria | 485 | 520 |
| Dichlorofluoroscein | Cytoplasm | 504 | 529 |
| CellROX® Orange | Cytoplasm | 545 | 565 |
| CellROX® Deep Red | Cytoplasm | 640 | 665 |

OPTO-FLUIDIC ARRAY FOR RADICAL PROTEIN FOOT-PRINTING

CROSS REFERENCE TO RELATED APPLICATIONS

This application claims the benefit of U.S. provisional application No. 63/128,439 filed on Dec. 21, 2020 and is also a continuation-in-part of U.S. non-provisional application Ser. No. 17/193,913 filed Mar. 5, 2021, now U.S. Pat. No. 11,181,529; which is a continuation-in-part of PCT/US20/12430 filed on Jan. 6, 2020 and also a continuation-in-part of PCT/US19/57059, filed Oct. 18, 2019; both PCT/US20/12430 and PCT/US19/57059 are continuations-in-part of U.S. non-provisional patent application Ser. No. 16/316,006 filed Jan. 7, 2019, now U.S. Pat. No. 10,816,468; U.S. non-provisional application Ser. No. 16/316,006 claims the benefit of U.S. provisional patent applications No. 62/747,247 filed Oct. 18, 2018 and No. 62/788,219 filed Jan. 4, 2019; PCT/US19/57059 further directly claims the benefit of U.S. provisional patent application No. 62/747,247 filed Oct. 18, 2018; PCT/US20/12430 and PCT/US19/57059 both also claim the benefit of U.S. provisional patent application No. 62/788,219 filed Jan. 4, 2019. All of the above patent applications are hereby incorporated herein by reference.

STATEMENT OF GOVERNMENT SUPPORT

The invention was made with government support under grant numbers R43 GM137728, R43 GM125420, and R44 GM125420 awarded by the National Institutes of Health. The Government has certain rights in the invention.

BACKGROUND

Field of the Invention

The present invention relates to a device and methodologies for higher order structural analysis of biomolecules by the process of radical protein foot-printing. Some embodiments of the present invention relate to the determination of biopharmaceutical tertiary and quaternary structure and associated conformation using improved devices and methodologies for flash photo-oxidation of proteins as processed using an integrated optical and microfluidic chip to determine protein higher order biomolecular structure.

Related Art

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

Biosimilars are therapeutics similar to but not identical to existing innovator or reference products. Unlike the case for small molecule drugs, biosimilars are not merely generic versions of original products. Conventional generics are considered to be therapeutically and molecularly equivalent to their originators. This is simply not the case with biosimilars, which are complex, three-dimensional biomolecules, whose heterogeneity and dependence upon production in living cells makes them quite different from classical drugs. The structures and functional activities of bio-therapeutics are exquisitely sensitive to their environments. The intended structure of a therapeutic is maintained by a delicate balance of factors, including concentration of the protein, control of post-translational modifications, pH as well as co-solutes in the formulation, and production/purification schemes (Gabrielson, J. P.; Weiss IV, W. F., *Technical decision-making with higher order structure data: starting a new dialogue*; Journal of Pharmaceutical Sciences, 2015). As such, biopharmaceutical structure must be prudently maintained, for if not held in check, undesirable and adverse pharmacological consequences can arise.

Adverse drug reactions (ADR) of biopharmaceuticals are typically attributed to exaggerated pharmacology as well as immunological reactions. The range of patient ADRs extends from symptomatic irritation to morbidity and death. While the etiology for some ADRs may be traced to patient pharmacogenomic sensitivity, many are attributed to intrinsic properties of the therapeutic, which has resulted in morbid and fatal patient consequences and substantial financial loss to the biotherapeutic industry (Giezen, T. J.; Schneider, C. K., *Safety assessment of biosimilars in Europe: a regulatory perspective*; Generics and Biosimilars Initiative Journal; 2014). As such, the occurrence of catastrophic ADRs has exemplified the need for improved analytics for the development and quality control of biopharmaceuticals.

In order to minimize ADRs and to facilitate the development of biosimilars, the FDA, the Center for Drug Evaluation and Research, and the Center for Biologics Evaluation and Research have issued guidelines that stress the use of state-of-the art technology for evaluating protein higher order structure (HOS) (*Quality considerations in demonstrating bio-similarity of a therapeutic protein product to a reference product; guidance for industry*; U.S. Department of Health and Human Services; Food and Drug Administration; Center for Drug Evaluation and Research; Center for Biologics Evaluation and Research Washington, D.C.; 2015). HOS analysis involves the determination of the tertiary and quaternary structure and associated conformation of a given biomolecule. Such biomolecules include protein and protein conjugates which may or may not be considered to be a biotherapeutic agent. Although a variety of HOS analytics exist today, their inadequacies to reliably predict biotherapeutic efficacy and safety has been brought into question, establishing the unmet need for new and improved HOS analytics (Gabrielson, J. P.; Weiss IV, W. F., *Technical decision-making with higher order structure data: starting a new dialogue*; Journal of pharmaceutical sciences; 2015).

A technique to address the unmet need for HOS analysis is a radical protein footprinting technique that relies upon irreversible protein hydroxylation, in combination with mass spectrometry (MS), (Hambly, D. M.; Gross, M. L., *Laser flash photolysis of hydrogen peroxide to oxidize protein solvent-accessible residues on the microsecond timescale*; Journal of the American Society for Mass Spectrometry; 2005). This process has been coined hydroxyl radical protein foot-printing (HRPF). A variety of techniques have been used to perform HRPF. Perhaps the most widely used approach relies upon fast photochemical oxidation of proteins (FPOP) that generates hydroxyl (OH) radicals from hydrogen peroxide ($H_2O_2$) using a single, high fluence, short pulse of UV light. The reaction of OH radicals and solvent exposed amino acids typically results in net insertion of one oxygen atom into the amino acid. OH radicals are short-lived, and when generated by a brief UV pulse, reactions between amino acids and radicals may be completed before any conformation change by the labeled protein can occur (Konermann, L.; Tong, X.; Pan, Y., *Protein structure and* dynamics studied by mass spectrometry: H/D exchange, hydroxyl radical labeling, and related approaches; Journal of mass spectrometry; 2008). The mass spectra of the peptide products of enzyme digestion show various levels of oxidation marked by peak shifts of 16 Da, 32 Da, 48 Da, etc. This information can be used to deduce which of the peptides are located on the exterior of the HOS and, thus, lead to greater understanding of the HOS.

Recently Gross and coworkers demonstrated another radical protein footprinting technique based upon the creation of trifluoromethyl ($CF_3$) radicals formed by hydroxyl radical attack of aqueous sodium triflinate (Cheng, M. et al., Laser-Initiated Radical Tirfluoromethylation of Peptides and Proteins: Application to Mass-Spectrometry-Based Protein Footprinting; Angewandte Chemie International Edition, 2017, 56(45): p. 14007-14010). When proteins are labeled via $CF_3$ radicals, the mass spectra of their peptide products are shifted by +69 Da. When compared to OH radical attack, $CF_3$ radicals are shown to be highly complementary in their amino acid reaction rates and when used in combination with OH radicals, results in superior coverage of surface exposed amino acids when compared to just OH radicals alone. As was the case with HRPF, $CF_3$ labeling information can be used to deduce which of the peptides are located on the exterior of the protein and, thus, lead to greater understanding of protein HOS.

A technical limitation of HRPF that deleteriously impacts comparative studies stems from the reaction of OH radicals with non-analyte components in the sample, such as buffer constituents, incipient solutes, and extraneous biologicals. Variability in the rate of background scavenging causes trial-to-trial irreproducibility, which has limited comparative studies (Niu, B. et al.; *Dosimetry determines the initial OH radical concentration in fast photochemical oxidation of proteins (FPOP)*; Journal of the American Society for Mass Spectrometry; 2015). While OH radicals are excellent probes of protein topography, they also react with many compounds found in analytical preparations. Competition between analyte protein and background scavengers for free OH radicals exists, making it desirable to measure the effective concentration of radical available to oxidize a target protein to ensure reproducible results. Similarly, variability of background scavenging also deleteriously impacts reproducibility in $CF_3$ radical footprinting. In photochemistry, effective radical concentration is measured using a radical dosimeter internal standard. Ideally, a dosimeter would have: a simple relationship between effective radical concentration and dosimeter response; a simple, rapid, and non-destructive measurement means; and be unreactive to most proteins.

Prior art teaches radical dosimetry as performed using spiked peptide internal standards (Niu, B., et al., *Dosimetry determines the initial OH radical concentration in fast photochemical oxidation of proteins (FPOP)*. J Am Soc Mass Spectrom, 2015. 26(5): p. 843-6; Niu, B., et al., *Incorporation of a Reporter Peptide in FPOP Compensates for Adventitious Scavengers and Permits Time-Dependent Measurements*. J Am Soc Mass Spectrom, 2016.), or a UV absorbing internal standard, such as adenine, added to the buffer and assessed in a post-labeling manner (Xie, B.; Sharp, J. S., Hydroxyl Radical Dosimetry for High Flux Hydroxyl Radical Protein Foot-printing Applications Using a Simple Optical Detection Method. *Analytical chemistry* 2015, 87 (21), 10719-23.). In peptide radical dosimetry, labeled peptide and target protein are subsequently analyzed using LC-MS (with optional proteolysis) to assess the relative ratio of oxidized peptide to that of the target protein. Should the desired peptide to protein oxidation ratio not be achieved, the entire experiment is repeated adjusting the concentration of $H_2O_2$ dependent upon the need to either increase or decrease effective OH radical load. For adenine dosimetry, the effective change in adenine UV absorbance is determined upon completion of the labeling process, and the ratio of the achieved vs target adenine UV absorbance change is determined. The $H_2O_2$ concentration is subsequently varied in accordance with the desired change in UV absorbance. Both approaches are performed after labeling has been completed and do not enable real-time adjustment of effective OH radical load, consuming precious sample and needlessly wasting investigator time.

U.S. Pat. No. 10,816,468 and International Application PCT/US18/34682 teach systems and methods by which to perform radical dosimetry in real-time, as biologicals are labeled during the FPOP HRPF process. While creating a real-time means to adjust and compensate for variation in background scavenging, the systems and method here requires the addition of an extrinsic internal standard dosimeter to the biological mixture. Under some conditions, the extrinsic internal standard may cause artifactual changes in biomolecular higher order structure, and as such, be incompatible for the desired goal of providing a facile means of characterizing nascent higher order structure of biologicals. The disclosures of U.S. Pat. No. 10,816,468 and PCT/US18/34682 applications are hereby incorporated herein by reference.

U.S. Provisional application No. 62/747,247 and PCT/US19/57059 describe a device and methodologies by which commonly used biological buffer systems can be employed as radical dosimeter internal standards. The photometric properties of some commonly employed biological buffers are altered in a predictable manner upon OH radical attack. As such, these buffers can be employed as radical dosimeter internal standards, eliminating the need to add extrinsic reagents, and as the solvating properties of these buffers are well established to stabilize nascent configurations of biomolecules, they do not alter biological higher order structure.

The afore noted art describes devices and means by which to perform HRPF radical dosimetry while labeling proteins or biopharmaceuticals in vitro. However, the practice of applying the results of in vitro structural experiments to authentic in vivo behavior has been brought into question (Mourão, M. A.; Hakim, J. B.; Schnell, S., Connecting the dots: the effects of macromolecular crowding on cell physiology. *Biophysical Journal* 2014, 107 (12), 2761-2766). Because of shortcomings of in vitro HRPF, there has been recent interest and desire to extend the use of HRPF to intact whole cells in an in vivo manner. For example, U.S. Pat. No. 10,851,335 B2 describes a means and methodology by which in vivo HRPF can be performed. Briefly, a plurality of fused-silica capillary tubes and microfluidic fittings are used to support the mixing of buffer suspended cells with $H_2O_2$. As taught, $H_2O_2$ is rapidly taken up by the cells without causing cellular disruption, inducing apoptosis, or precipitating cell death. However, the systems and methods taught still result in a variety of shortcomings. U.S. Provisional 62/788,219 and PCT/US2020/012430 describes a device and methodology by which in vivo FPOP HRPF is improved by providing means to perform in-cell radical dosimetry to assess and adjust for intracellular cytoplasmic or organellar radical scavenging. Moreover, it teaches a means by which sheath flow rates and subsequent cell-tocell spacing can be assessed and ultimately controlled to insure effective irradiation of suspended cells during the in vivo labeling process.

The afore noted art describes devices and means by which to perform in vitro or in vivo FPOP HRPF to label proteins or biopharmaceuticals using fused silica capillaries as a means to transport, establish sheath flow, chemically treat, initiate photo-radical reactions, and to further provide an optical region in which to probe the photometric properties of proteins, cells, chemical reagents, and labeling products. While useful for these early stage experiments, fused silica capillaries have several undesirable characteristics: 1) they are fragile and prone to accidental breakage, especially when the outer protective polyimide coating is removed; 2) they require removal of the ultra violet (UV) opaque polyimide coating to enable hydroxyl radical formation from $H_2O_2$ and concordant UV photometric dosimetry; 3) they demand considerable care to ensure appropriate alignment to optical componentry; 4) they require expensive and cumbersome microfluidic fittings to create and form fluidic circuitry such as that required to facilitate in vivo FPOP, and 5) they are tedious to replace. It is not uncommon for small ID (≤100 μm) capillaries to become accidentally clogged or break upon the application of high fluence. As such, the systems and methods previously taught result in a variety of shortcomings.

SUMMARY

Various embodiments of the invention include systems and methods that address the above noted shortcomings of present day in vitro radical protein footprinting by providing a means of replacing fused-silica capillaries with an opto-fluidic chip component that supports on-line mixing of target proteins with labeling reagents. Disclosed systems include a to serpentine photolysis cell that substantially increases the illuminated volume during the photo-induced radical chemistry when compared to capillary configurations. Various embodiments comprise an in-line dosimetry cell for real-time photometric assessment of effective radical production and adjustment for unwanted background scavenging using the photometric properties of an in vitro radical dosimeter internal standard.

Various embodiments of the invention include systems and methods that address the above noted shortcomings of present day in vivo radical protein footprinting by providing the means of replacing fused-silica capillaries with an opto-fluidic chip component that supports on-line mixing of target cells with labeling reagents. Various embodiments support the creation of microfluidic sheath-flow to enable precise control of cell-to-cell distances allowing for effective and consistent irradiation of each cell's exterior and intracellular compartments such as with a serpentine photolysis cell that substantially increases the illuminated volume during the photo-induced radical chemistry when compared to capillary configurations. Various embodiments comprise an in-line dosimetry cell for real-time photometric assessment of effective radical production and adjustment for unwanted background scavenging using the photometric properties of an in vivo radical dosimeter internal standard. Various embodiments also provide the means by which cellular singulation and partitioning can be assessed and reproducibly controlled, as well as a means to determine the arrival time of a cell into an HRPF photolysis zone.

Various embodiments of the invention are directed to on-chip systems and methods for the analysis of protein higher order structure comprising improved embodiments to perform in-vivo or in vitro flash photo-oxidation of proteins enabling advanced radical protein footprinting. In some embodiments this invention provides an in-line, radical to dosimetry system wherein closed-loop control is established between the flash photolysis system and the dosimeter to control irradiance of the flash photolysis system in response to measured changes in the photometric properties of an internal standard radical dosimeter.

In some embodiments, the invention includes an on-chip, in-line, in vivo or in vitro radical dosimetry system wherein closed-loop control is established between an automated, in-line micro-fluidic mixing system and a dosimeter to control the concentration of labeling reagent in response to measured changes in the photometric properties of an internal standard radical dosimeter.

In some embodiments, the invention includes an on-chip, in-line, in vivo or in vitro radical dosimetry system wherein closed-loop control is established between the flash photolysis system and dosimeter to control irradiance of the flash photolysis system in response to measured changes in the photometric properties of an internal standard radical dosimeter, for which radicals are created by the photolysis of the labeling reagent.

In some embodiments, using an on-chip, in vivo in-line radical dosimetry system, the invention includes methods of producing labeled biomolecules for analysis comprising: (1) mixing cells with a biological buffer, an internal standard radical dosimeter that is ultimately taken up by the cell, and other labeling reagents, (2) introducing the cells into an optical dosimetry zone, (3) determining the nascent photometric properties of the cells, (4) photo-irradiating the cells in an optical photolysis zone with at least one burst of UV irradiation, (5) determining the change in photometric properties for the cells after photo-irradiation, and (6) adjusting the spectral irradiance of the UV source light in accordance with the change in radical dosimeter photometric property.

In some embodiments, using an on-chip, in vitro in-line radical dosimetry system, the invention includes methods of producing labeled biomolecules for analysis comprising: (1) mixing target protein or proteins with a biological buffer, an internal standard radical dosimeter, and other labeling reagents, (2) introducing the mixture into an optical dosimetry zone, (3) determining the nascent photometric properties of the mixture, (4) photo-irradiating the mixture in an optical photolysis zone with at least one burst of UV irradiation, (5) determining the change in photometric properties for the mixture after photo-irradiation, and (6) adjusting the spectral irradiance of the UV source light in accordance with the change in radical dosimeter photometric property.

In some embodiments, using an on-chip, in vivo, in-line radical dosimetry system, the invention includes methods of producing labeled biomolecules for analysis comprising: (1) mixing cells with a biological buffer, an internal standard radical dosimeter that is ultimately taken up by the cell, and other labeling reagents, (2) introducing the cells into an optical dosimetry zone, (3) determining the nascent photometric properties of the cells, (4) photo-irradiating the cells within an optical photolysis zone with at least one burst of UV irradiation, (5) determining the change in photometric properties for the cells after photo-irradiation, and (6) adjusting the concentration of labeling reagent using an in-line, microfluidic mixer in accordance with the change in radical dosimeter photometric property.

In some embodiments, using an on-chip, in vitro, in-line radical dosimetry system, this invention includes methods of producing labeled biomolecules for analysis comprising: (1)

mixing target protein or proteins with a biological buffer, an internal standard radical dosimeter, and other labeling reagents, (2) introducing the mixture into an optical dosimetry zone, (3) determining the nascent photometric properties of the mixture, (4) photo-irradiating to the mixture within an optical photolysis zone with at least one burst of UV irradiation, (5) determining the change in photometric properties for the mixture after photo-irradiation, and (6) adjusting the concentration of labeling reagent using an in-line, microfluidic mixer in accordance with the change in radical dosimeter photometric property.

In some embodiments, using an on-chip, in vivo, in-line radical dosimetry system, the invention includes methods of producing labeled biomolecules for analysis comprising: (1) mixing cells with a biological buffer, labeling reagents, and internal standard radical dosimeter that are ultimately taken up by the cell, (2) introducing said cells into an optical dosimetry zone, (3) detecting the arrival and presence of said cells cell by monitoring the intensity of scattered light exiting the dosimetry zone, (4) determining the elapsed time between the arrival of consecutive cells, (5) determining the cell isolation volume per the product of the elapsed time and net buffer flow rate, and (6) adjusting the sheath flow and buffer flow parameters to achieve a desired cell isolation volume.

In some embodiments, using an on-chip in vivo, in-line radical dosimetry system, the invention includes methods of producing labeled biomolecules for analysis comprising: (1) mixing cells with a biological buffer, labeling reagents, and an internal standard radical dosimeter that are ultimately taken up by the cell, (2) introducing the cells into an optical dosimetry zone, (3) detecting the arrival and presence of the cells cell by monitoring the change in phase of the light exiting the dosimetry zone, (4) determining the elapsed time between the arrival of consecutive cells, (5) determining the cell isolation volume per the product of the elapsed time and net buffer flow rate, and (6) adjusting the sheath flow and buffer flow parameters to achieve a desired cell isolation volume.

In some embodiments, using an on-chip, in vivo, in-line radical dosimetry system, the invention includes methods of producing labeled biomolecules for analysis comprising: (1) mixing cells with a biological buffer, labeling reagents, and an internal standard radical dosimeter that are ultimately taken up by the cell, (2) introducing the cells into an optical dosimetry zone, (3) detecting the arrival and presence of a cell by monitoring the intensity of scattered light exiting the dosimetry zone, (4) determining the net flow rate for the arriving cell, (5) determining the interconnect volume that extends from the photolysis zone and the dosimetry zone, (6) determining the transit time required for the cell to travel from the photolysis zone to the dosimetry zone, (7) determining the photolysis zone arrival time for the cell, and (8) triggering the photolysis system at such time when all subsequent cells arrive at the photolysis zone.

In some embodiments, using an on-chip in vivo, in-line radical dosimetry system, the invention includes methods of producing labeled biomolecules for analysis comprising: (1) mixing cells with a biological buffer, labeling reagents, and an internal standard radical dosimeter that are ultimately taken up by the cell, (2) introducing the cells into an optical dosimetry zone, (3) detecting the arrival and presence of a cell by monitoring the phase of the exiting the dosimetry zone, (4) determining the net flow rate for the arriving cell, (5) determining the interconnect volume that extends from the photolysis zone and the dosimetry zone, (6) determining the transit time required for the cell to travel from the photolysis zone to the dosimetry zone, (7) determining the photolysis zone arrival time for the cell, and (8) triggering the photolysis system at such time when all subsequent cells arrive at the photolysis zone.

Following the production of labeled biomolecules, other methods, such as mass spectrometry or electrophoresis, may be used to identify labeled peptides and deduce information regarding higher order structures of biomolecules in vivo or in vitro.

Various embodiments of the invention include an on-chip analysis system comprising: a sample introduction system configured to provide intact biological entities to a photolysis zone, the biological entities being isolated from each other in a focused sheath flow; a photolysis light source configured to generate light to generate radicals from a source of a labeling reagent; a photolysis zone configured to receive the sheath flow and the light so as to label an internal standard and so as to label biological compounds of the biological entities in vivo; a dosimetry zone configured to receive the biological entities from the photolysis zone, to detect the presence of the biological entities using a scattered light detector and to detect oxidation of the internal standard using a fluorescence detector; control logic configured to determine a target concentration of radicals for each of the biological entities and to adjust operation of the photolysis zone to meet the target concentration of said radicals; and a reservoir configured to receive the biological entities including the labeled biological compounds.

Various embodiments of the invention include an on-chip method of labeling biomolecules within an intact cell, the method comprising: introducing a sample mixture containing at least one cell into a photolysis zone, a source of labeling radicals and a dosimeter internal standard into a photolysis zone of a flash photolysis system; providing light to generate the labeling radicals from the source of labeling radicals, the labeling radicals being configured to label biomolecules within the at least one cell; waiting an optionally predetermined time for the at least one cell to reach a dosimetry zone of a radical dosimeter configured to detect a photometric property of the dosimeter internal standard resulting from reaction of the dosimeter internal standard and the labeling radicals, wherein the at least one cell is detectable within a dosimetry zone of the radical dosimeter by light scattering; measuring a photometric property of the dosimeter internal standard using the radical dosimeter, while the at least once cell is within the dosimetry zone; determining that a target level of labeling radicals was not generated based on the measured photometric property of the dosimeter internal standard; and adjusting a concentration of labeling radicals within the photolysis zone by adjusting at least one of: 1) an amount of light provided to the photolysis zone, 2) a concentration of the source of labeling radicals, 3) a flow rate of the at least once cell within the photolysis zone, or 4) adjusting a time of providing the light to the photolysis zone. It should be noted that in the foregoing embodiments a series of light pulses provided to the photolysis zone have both a periodicity and a phase and adjusting the phase of the periodic pulses shifts the timing of the pulses without changing the periodicity.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized. Further, the above objects and advantages of the invention will become readily apparent to those skilled in the art from reading the following description of exemplary embodiments when considered in the light of the accompanying figures that incorporate features of the present invention. The components in the drawings are not necessarily to scale, emphasis instead being placed upon clearly illustrating the principles of the present disclosure.

Any of the methods described herein can according to specific embodiments further make use of any one or more of the following of which:

FIG. 7 is a table that lists the cellular distribution and fluorescence excitation and emission wavelengths for several internal standard radical dosimeters.

DETAILED DESCRIPTION

Figure 1:
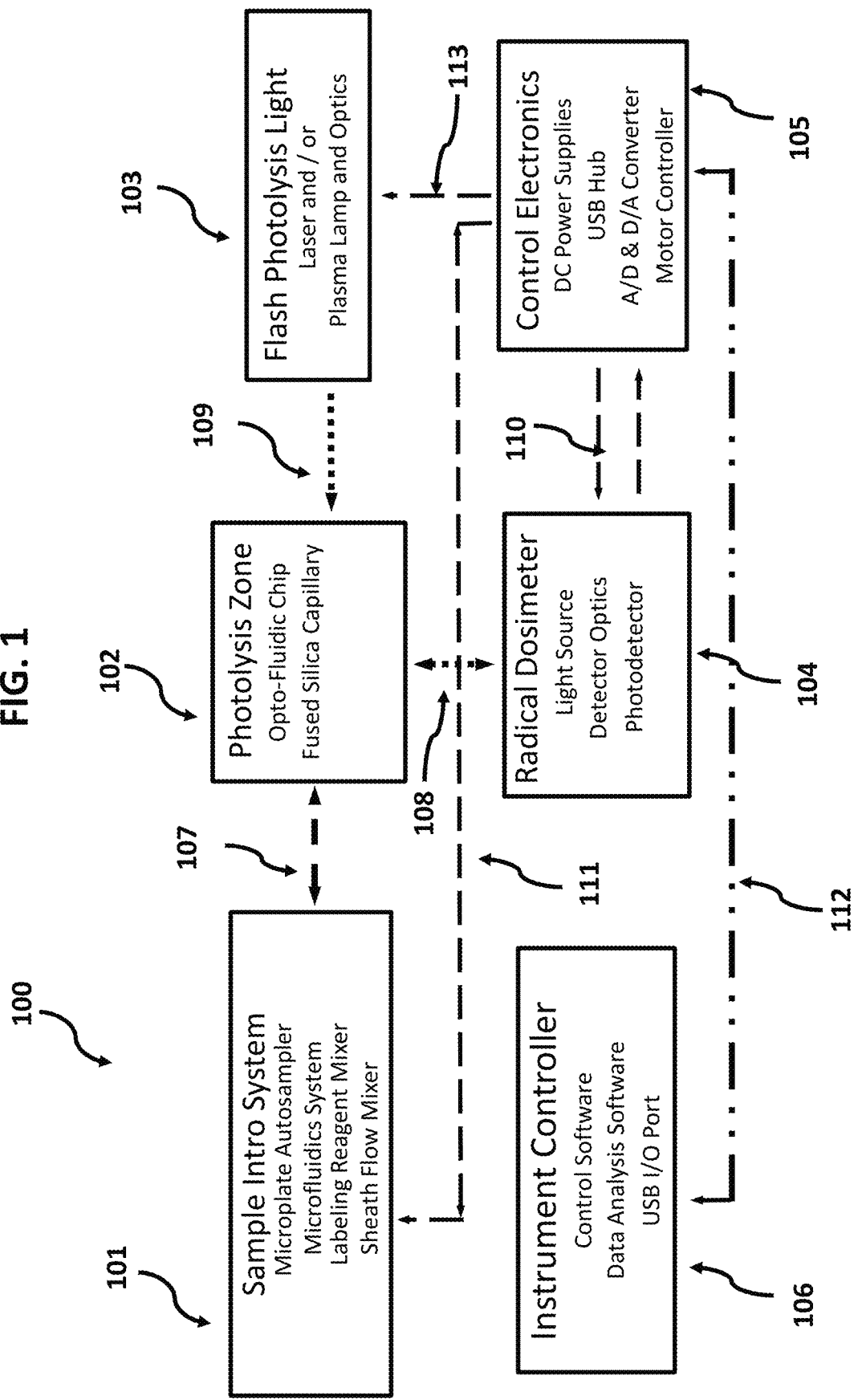
FIG. 1 illustrates embodiments of a flash photolysis system.

Devices and methods are provided for the analysis of biomolecular higher order structure that is accomplished by selective labeling of solvent exposed molecular groups, as catalyzed by on-chip in vivo or in vitro fast photo-oxidation with real-time monitoring and control of effective radical concentration. Moreover, devices and methods are provided for the analysis of biomolecular higher order structure that is accomplished by on-chip, in-line microfluidic mixing of labeling reagents with target proteins, cells or other in vivo embodiments. Moreover, devices and methods are provided for the analysis of biomolecular higher order structure that is accomplished by on-chip, microfluidic channels that serve to create sheath flow to support in vivo fast photo-oxidation reactions. Moreover, devices and methods are provided for the analysis of biomolecular higher order structure that is accomplished by on-chip, in line photo-chemically induced reactions using an integral serpentine photolysis cell.

Devices and methods are provided for the analysis of biomolecular higher order structure that is accomplished by selective labeling of solvent exposed molecular groups, as catalyzed by on-chip in vivo or in vitro fast photo-oxidation with real-time monitoring and control of effective radical concentration. Moreover, devices and methods are provided for the analysis of biomolecular higher order structure that is accomplished by on-chip in vivo fast photo-oxidation with real-time monitoring and control of in vivo species isolation volume and subsequent flash photolysis. The devices and methods can be applicable to a variety of in vivo embodiments that are photometrically translucent or transparent such as but not limited to: eukaryotic cells, prokaryotic cells, bacteria, intra-cellular viruses, virions, virus-like particles, single-cell organisms, eukaryotic tissues, and multi-cellular organisms. While the present invention refers to cells for illustrative purposes, such reference is not restrictive, and it is to understood that such references are inherently applicable to all photometrically translucent or transparent in vivo biological or non-biological entities.

The devices and methods can be applicable to a variety of research fields, such as: general protein biochemistry; diagnostics research and development; infectious disease research; biopharmaceutical research and development; antibody research and development; biosimilar development; therapeutic antibody research and development; small molecule drug research and development; and development of other therapeutic compounds and materials. Moreover, the devices and methods can be applicable to a variety of research analyses such as: protein-ligand interaction analysis; protein-protein interaction analysis; protein-DNA interactions; protein-RNA interactions; protein-fusion product analysis; protein conformation and conformational change analysis; cell-cell interactions; virus-cell interactions; small drug molecule mode of action analysis; biopharmaceutical mode of action analysis; antibody-antigen analysis; protein epitope mapping; protein paratope mapping; and chemical reaction monitoring.

The device can receive cells for subsequent chemical labeling via a step-wise introduction of target protein or cells by manually pipetting the target protein or cells into appropriate micro-centrifuge tubes or microplates that are placed into the system's sample introduction assembly. Alternatively, the device can be hyphenated with and receive target protein or cells directly from other separation and analysis instruments such as but not limited those which perform selective protein separation, cell sorting, cell counting, and cell isolation from tissue.

This section provides a general overview of the flash photolysis instrument with on-chip in-line, in vivo or in vitro radical dosimeter that uses the photometric properties of an internal standard dosimeter to assess and ultimately control in vivo or in vitro effective radical concentration. Moreover, this section provides a general overview of the present invention that uses the photometric properties of an in vivo embodiment to assess isolation volume and to precisely control the segregation of said in vivo embodiments within a flowing stream of buffer. A detailed description of each sub-assembly is provided elsewhere herein. Moreover, methods that describe the interplay of these subassemblies are provided to enable understanding of typical instrument operation.

Various embodiments of the invention include a flash photolysis system 100, as illustrated in FIG. 1. Flash photolysis system 100 is configured for real-time radical dosimetry and comprises a number of subassemblies. Shown are: sample introduction system 101; photolysis zone 102; flash photolysis light source 103; radical dosimeter 104; control electronics 105; instrument controller 106; fluidic interconnection line 107 between the sample introduction system 101 and photolysis zone 102; fluidic inter-connection line 108 between the photolysis cell and radical dosimeter;

photonic interconnect 109 between flash photolysis light source 103 and photolysis zone 102; electronic inter-connects 110 between the radical dosimeter 104 and control electronics 105; electronic inter-connects 111 between the sample introduction system 101 and control electronics 105; electronic inter-connects 112 between the control electronics 105 and instrument controller 106; and electronic inter-connects 113 between the control electronics and the flash photolysis system. Together, photolysis zone 102, flash photolysis light source 103 and radical dosimeter 104 comprise a "flash photolysis system."

Photolysis zone 102 is typically included in a photolysis cell. Flash photolysis system 100 is configured to oxidize in vitro samples or in vivo sample cells in real-time to achieve radical dosimetry. Analytes are introduced via the sample introduction system 101. Analytes can be presented using small volume micro-centrifuge tubes or by using multi-well microtiter plates as readily available from Eppendorf (Hamburg, Germany). Microfluidic circuitry is configured for analyte aspiration, mixing with labeling reagent, cellular hydrodynamic focusing using a sheath flow apparatus for in vivo processing, transportation to photolysis and dosimetry zones, as well as the transportation and deposition of labeled product. In some embodiments, sample introduction system 101 is configured to provide intact biological entities to a photolysis zone (e.g., photolysis zone 102, the biological entities being isolated from each other in a focused sheath flow). The sheath flow is typically configured to isolate the biological entities from each other. For example, using proper conditions, the biological entities are separated from each other by regular intervals.

Photo-oxidation occurs within the photolysis zone 102. In some embodiments, the photolysis zone is located within an opto-fluidic chip. In some embodiments, opto-fluidic chips are fabricated using a variety of techniques such as lithography-assisted wet chemical etching, dry reactive ion etching, and laser ablation micro-structuring that create microfluidic channels within a silicon or quartz substrate. In some embodiments, opto-fluidic chips are fabricated by embossing fluidic channels within a plastic substrate, where formed fluidic channels transport sample into optically transparent cells created by sealing optically transparent windows to regions where the plastic substrate has been removed. Such optically transparent windows can be disposed on just one side, or on both sides, of the photolysis and dosimetry cells disclosed herein. Exemplary plastic substrates include but are not limited to: polycarbonate, polyethylene, polyether-ether-ketone, cyclic olefin polymer, cyclic olefin copolymer, polytetrafluorethene, Kalrez®, and polychlorotrifluoroethylene. Fluidic and optical channel internal diameters can range from, but are not limited to, 0.1 to 5.0 mm. In some embodiments, fluidic and optical channels can have different internal diameters to ideally address disparate requirements of fluid transfer, fluid mixing, hydrodynamic focusing, and optical coupling. In some embodiments, the photolysis zone is comprised of a serpentine array of channels that juxtaposes multiple fluidic pathways in a counter-current fashion.

The photolysis zone 102 receives analyte from the sample introduction system 101 via a microfluidic path 107. After processing, photo-irradiated analyte within the photolysis zone 102 is transferred into the radical dosimeter 104. The photolysis zone 102 is in optical communication with the flash photolysis light source 103. Flash photolysis light source 103 is an example of a photolysis light source configured to generate light to generate labeling radicals within photolysis zone 102 from a source of labeling reagent. In some embodiments, photolysis zone 102 is configured to receive the sheath flow including biological entities, to receive light from flash photolysis light source 103 so as to oxidize the dosimeter internal standard so as to oxidize biological compounds of the biological entities in vivo. For example, proteins and peptides comprising amino acids may be oxidized in the photolysis zone 102.

The photolysis zone 102, flash photolysis light source 103 and radical dosimeter 104 comprise a flash photolysis system. The flash photolysis system is comprised of: a plasma flash lamp or other appropriate light source such as an excimer laser, a solid state laser, or laser diode; and associated light collection/transmission optics to match the requirements of the light transmission means to the photolysis zone.

The radical dosimeter 104 is configured to receive labeled analyte from the photolysis zone 102, or in alternative embodiments, the radical dosimeter 104 is incorporated into the photolysis zone 102 by employing an orthogonal optical path. A variety of photometric detection schemes may be employed by the radical dosimeter to monitor the associated photometric properties of the dosimeter internal standard. In some embodiments, the dosimeter internal standard can be an extraneous additive that is spiked into the biological sample. In some embodiments, the intrinsic photometric properties of a biological buffer system may serve as an intrinsic dosimeter internal standard. By "intrinsic" or "intrinsic to a buffer" it is meant that the internal standard is one of the chemical species that provides the buffering property. The buffer is optionally a physiologically compatible buffer configured to maintain the analyte or cells at a physiological pH or ion concentration. In some embodiments, the internal standard is configured to become fluorescent as a result of the light received from flash photolysis light received in photolysis zone 102. For example, the dosimeter internal standard may increase fluorescence by factors of at least 10, 100 or 1000 times upon reaction with hydroxide radical, in various embodiments.

Photometric detection schemes include but are not limited to: fluorescence, photometric absorbance, refractive index detection, light scatter detection, and luminescence. In some embodiments, the photometric detection scheme comprises a fluorescence detector employing ultraviolet (UV) photo-excitation source to create UV fluorescence or emission. In some embodiments, the fluorescence detector employs a UV excitation source to create visible fluorescence or emission. In some embodiments, the fluorescence detector employs a visible excitation source to create visible fluorescence or emission. In some embodiments, the fluorescence detector also includes an integral light scatter detector. In some embodiments, the fluorescence detector also includes an integral light refractive index detector.

The control electronics 105 functions to: provide direct current (DC) drive voltage, derived from laboratory alternating current (AC) power sources, to peripheral assemblies; provide analog and digital control signals to peripheral devices; receive analog or digital information from peripheral devices; provide ADC and digital to analog conversion (DAC) functions; and provide data to and receive commands from the instrument controller 106. In a typical embodiment, the control electronics assembly comprises a motor controller that interfaces with motors located within the sample introduction system 101. Moreover, the control electronics assembly in such embodiments may contain a universal serial bus (USB) hub for digital communication with the instrument controller 106.

The instrument controller 106 functions to provide process control for various instrument peripheral devices while receiving status and data information from these devices in digital format. In some embodiments, the instrument controller 106 runs a software control program with two main modules: a low-level, multi-threaded module for instrument component control and a high-level user interface (UI) module. In some embodiments, the control electronics 105 comprises an embedded microprocessor that provides low-level instrument component control while communicating with a high-level UI control program of the instrument controller 106 via a USB or wireless interface.

Together instrument controller 106, control electronics 105 and various interconnections represent control logic configured to control flash photolysis system 100. This control logic can be configured to perform steps of any of the methods disclosed herein. For example, in some embodiments, control logic is configured to determine that a target concentration of labeling radicals was generated for each biological entity. This target concentration is optionally selected to assure that the labeling reaction of a protein or of cell constituents has sufficient labeling radical agent to go near a desired level of completion.

The control logic may further be configured to manage the feedback loop that includes adjusting conditions in the photolysis zone 102 to meet the target concentration of labeling radicals. The conditions in the photolysis zone 102 may be adjusted by, for example, changing a concentration of a source of labeling radicals, changing a flow rate in the sample introduction system 101, changing an amount of light received from the photolysis light source 103, changing a time at which the light is received from the photolysis light source, changing a separation distance/volume of isolated cells, and/or the like. By changing conditions in the photolysis zone 102, control logic can provide feedback to sample introduction system 101 and/or the photolysis light source 103 based on analysis of a first analyte to improve analysis of a second analyte.

In some embodiments, control logic is configured to normalize a quantitation of oxidized and/or identified peptides from a cell based on a fluorescence signal from the internal standard within the dosimetry zone. This allows comparison of results from different experiments using different instances of flash photolysis system 100.

The control logic is optionally further configured to determine a time the photolysis light is received by cells in the photolysis zone 102 and/or to determine a time period between which isolated cells enter the photolysis zone 102. These determinations may be based on detection of fluorescence, scattered light, or change in phase of light in the dosimetry zone and may be controlled by adjusting flow rates and/or volumes in sample introduction system 101.

The control logic is optionally further configured to control a flow of cells to labeled cell reservoir and analyzer. For example, the control logic may be configured to control the flow of cells such that ruptured cells are diverted from a particular container of labeled cell reservoir, or such that different oxidized cells are placed in different compartments over a function of time. In some embodiments, control logic is configured to use an analyte signal from analyzer to control any aspect of flash photolysis system 100.

Instrument controller 106 and control electronics 105 are optionally combined into a single device.

In Vitro Analyte Photo-Chemical Labeling

Figure 2:
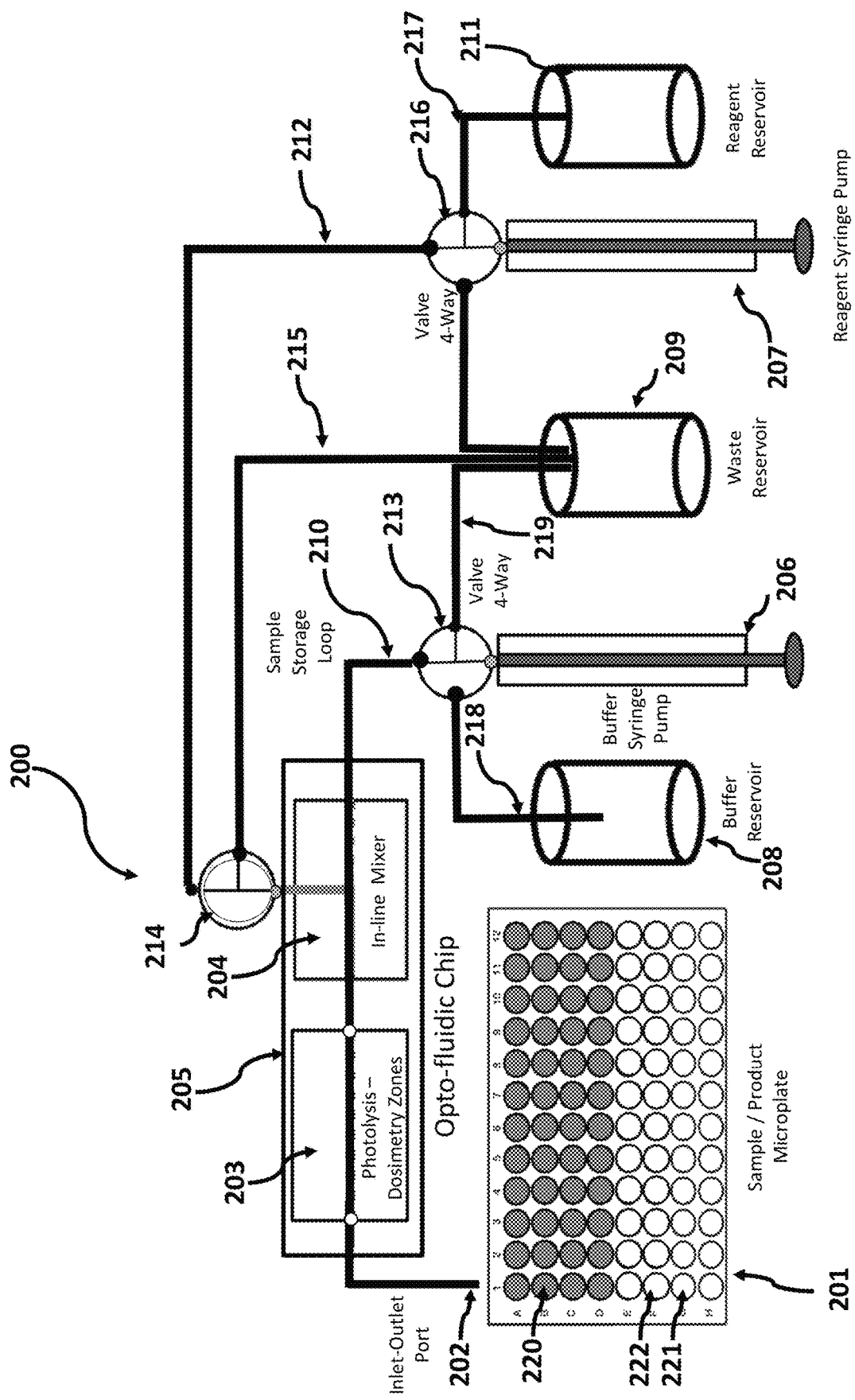
FIG. 2 illustrates embodiments of microfluidic system.

FIG. 2 illustrates further details of the flash photolysis system 100 as configured to support processing of an in vitro analyte, with particular description to the system's microfluidic system 200. Shown are: sample/product microplate 201; sample inlet/product outlet port 202; combined photolysis and dosimetry cells 203; in-line microfluidic mixer 204; opto-fluidic chip 205; buffer syringe pump 206; labeling reagent syringe pump 207; buffer reservoir 208; waste reservoir 209; sample storage loop 210; labeling reagent reservoir 211; reagent transfer line 212; buffer syringe pump four-way valve 213; in-line mixer gating valve 214; reagent waste line 215; labeling reagent syringe pump four-way valve 216; reagent introduction line 217; buffer introduction line 218; buffer waste line 219; sample microwell 220; waste collection microwell 221, and product collection microwell 222.

Samples to be labeled are stored within a storage vessel such as the sample/product microplate 201, such as the 96- or 384-well plates available from ThermoFisher (USA). Samples are introduced by aspiration through sample inlet/product outlet port 202. Aspirated samples pass through the system's dosimetry and photolysis zones 203 and are further drawn through in-line mixer 204. Inline mixer 204 and photolysis and dosimetry zones 203 are both formed within opto-fluidic chip 205.

Microfluidic system 200 comprises two syringe pumps, buffer syringe pump 206 and labeling reagent pump 207. Syringe pump 206 communicates with buffer reservoir 208, waste reservoir 209 and sample storage loop 210. Syringe pump 207 communicates with waste reservoir 209, reagent reservoir 211, and in-line mixer 204 via reagent transfer line 212.

Prior to the labeling process the microfluidic circuit is primed. Syringe pump 206 fills with buffer by switching its 4-way valve 213 to communicate with buffer reservoir 208. Its plunger is withdrawn to fill the syringe to its complete volume. Syringe pump 206 volume can range from but not limited to 50 uL, 100 uL, 250 uL, 500 uL, 1.5 mL, 2.0 mL, and 2.5 mL depending upon the desired volume of sample to be labeled. Syringe pump 206 then primes the microfluidic system by switching valve 213 to communicate with storage loop 210 and pumping sufficient volume to flush the system. During system flush, buffer is directed to flow through in-line mixer 204, photolysis and dosimetry zones 203, through port 202, to be ultimately dispensed into a designated waste well 221 of microplate 201. During this process, valve 214 remains closed to in-line mixer 204 so that buffer is directed through the chip 205 and not out through mixer 204 and ultimately into reagent transfer line 212.

After priming the chip, the reagent delivery circuit is primed. Reagent pump 207 fills entirely with reagent drawn from reagent reservoir 211 by drawing back its plunger while valve 216 connects to reagent introduction line 217. Reagent pump 207 volume can range from but not limited to 50 uL, 100 uL, 250 uL, 500 uL, 1.5 mL, 2.0 mL, and 2.5 mL depending upon the desired volume of sample to be labeled. Reagent delivery line 212 is flushed by pumping with reagent pump 207 with 4-way valve 216 configured to deliver syringe 207 contents to reagent delivery line 212 with valve 214 configured to direct priming volume to waste reservoir 209 via reagent waste line 215. Valve 214 is located proximal to in-line mixer 204 so that the interconnecting volume from valve 214 to mixer 204 is minimized to range from 0.25 to 1.5 uL. Further details of chip 205 fluidic connections are provided in FIG. 3.

The following steps outline an exemplary operational cascade used by embodiments described with respect to microfluidic system 200 to label an in vitro sample using photo-induced radical reactions. Variations of this cascade will be obvious to those skilled in the art, and such variations are taken to be functionally equivalent and not inventively distinct from the example provided here. Sample/product microplate 201 is arranged so that distinct micro wells 220 are designated to contain samples to be labeled, as well as empty micro wells 221 and 222 that will selectively collect labeled product, waste buffer, or labeling reagent deposited during fluidic priming of subsystems of the microfluidic system 200. For in vitro radical protein footprinting a microwell 220 contains a protein or other proteinaceous biological mixture. After priming, buffer syringe pump 206 dispenses a predetermined volume of buffer by moving valve 213 to communicate with sample loop 210, thusly pumping buffer through opto-fluidic chip 205 and out to a designated waste microwell 221 through inlet-outlet port 202. The volume pumped out here is to be slightly greater than the volume of sample to be labeled. For instance, should 100 μL of sample be targeted for labeling, syringe pump 206 will dispense 120 μL of buffer into waste microwell 221. Other differential volume ratios could be employed, and the above noted example is meant to be illustrative and not restrictive in scope.

Microplate 201 is moved so that port 202 is immersed into microwell 220 containing sample that is to be labeled. Buffer syringe pump 206 aspirates a predetermined volume of sample by withdrawing its plunger and fluidically communicating through valve 213, in-line mixer 204, photolysis-dosimetry cells 203 and port 202. Sample is drawn into chip 205 through photolysis-dosimetry cells 203 and in-line mixer 204 and ultimately into sample storage loop 210. During this sample aspiration process, in-line mixer gating valve 214 closes off the mixer so that labeling reagent is not drawn into the circuit.

Reagent reservoir 211 contains labeling reagent as required for the protein labeling process. For HRPF, reservoir 211 contains aqueous hydrogen peroxide at concentrations that typically range from 20 mM to 1000 mM, for example. For trifluoromethyl footprinting, reagent reservoir 211 will contain a mixture of hydrogen peroxide and aqueous sodium triflinate. If predominantly $CF_3$ radical labeling is desired, $H_2O_2$ and sodium triflinate are respectively mixed at a 1:4 concentration ratio, typically employing 5 mM $H_2O_2$ and 20 mM sodium triflinate. If simultaneous HRPF and $CF_3$ footprinting is desired then, $H_2O_2$ and triflinate are respectively mixed in a 5:1 ratio, typically employing 50 mM $H_2O_2$ and 10 mM triflinate. The above noted mixtures are intended to be exemplary and should not be construed as limiting in scope, as other ratios may serve to be functionally equivalent, and absolute conditions may vary based upon actual protein labeling conditions.

To start the labeling process, pumps 206 and 207 begin dispensing their respective solutions into the microfluidic circuit. The relative pumping speeds of pumps 206 and 207 is dependent upon the desired final concentration of labeling reagent to enter the photolysis zone and starting concentration of the labeling reagent located within reservoir 211. Using hydroxyl radical labeling as an example, reagent reservoir 211 may contain a 1000 mM concentration of $H_2O_2$ and the desired final concentration during labeling is 100 mM. Under such conditions, the pumping rate of pump 207 will be one tenth of the pumping rate of pump 206. The net flow rate is the sum of the pumping rates established by pumps 206 and 207.

Figure 3:
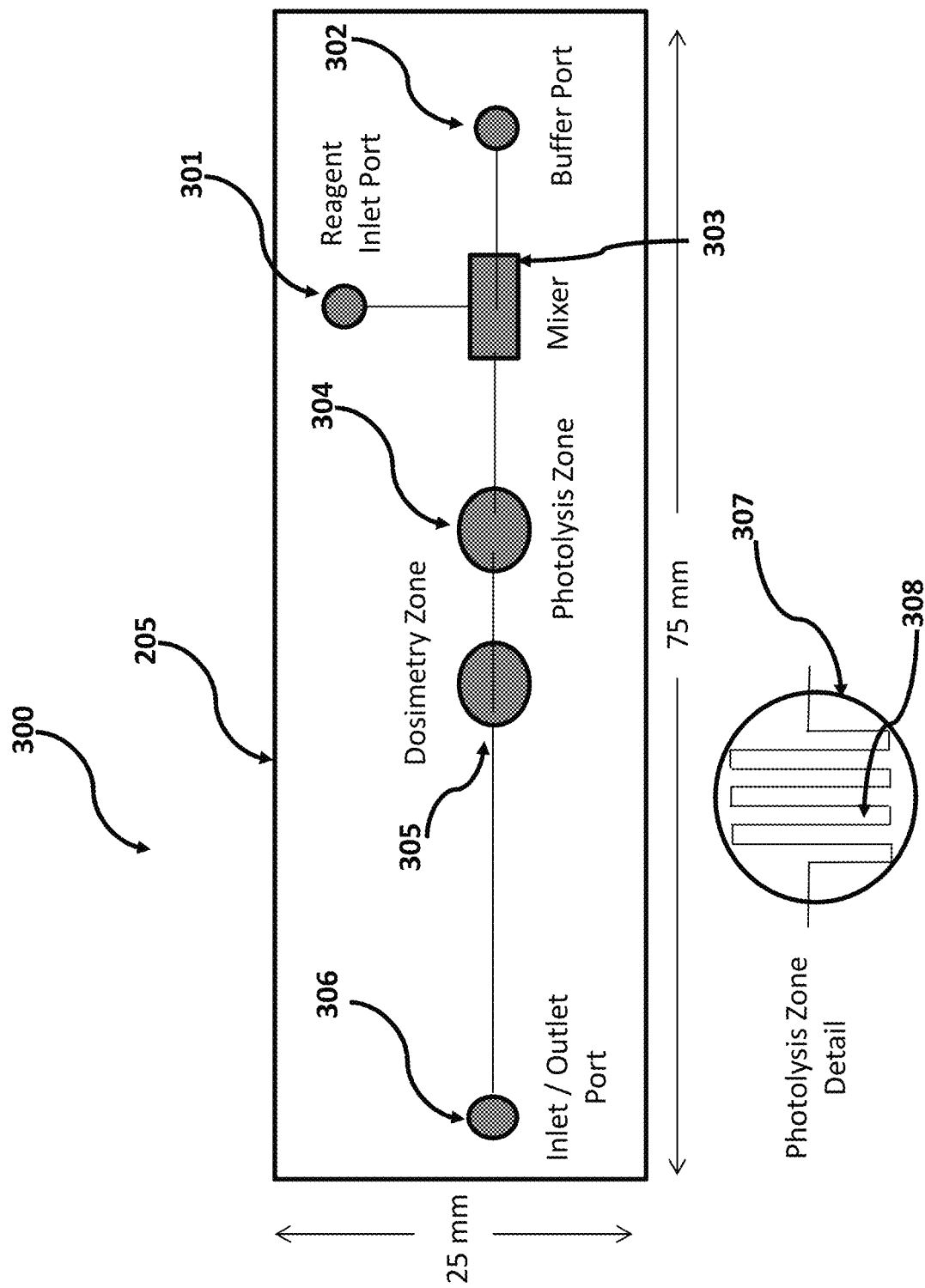
FIG. 3 illustrates in detail component embodiments of opto-fluidic chip.

FIG. 3 depicts further embodiments of an exemplary opto-fluidic array 300 that enables subsequent description. Shown are: reagent inlet port 301; buffer inlet port 302; mixer 303; photolysis cell 304; dosimetry cell 305; inlet/outlet port 306; and a detailed view of the photolysis cell 307 containing fluidic channels 308. After establishing flow through opto-fluidic chip 205, photolysis light source 103 is triggered to illuminate the photolysis zone 304 at regular flash intervals. Flash frequency may range from but not limited to 0.25 Hz to 5 Hz. The flash frequency and net flow rate are established to ensure that sample and labeling reagent mixture is only illuminated by a single flash and that each subsequent bolus of illuminated mixture is partitioned by a pre-determined isolation volume. As such, the illuminated volume of the photolysis cell defines the requisite net flow and flash rates.

In capillary-based photo-induced radical footprinting, the photolysis light source is focused to illuminate a small volume of fluid located within the capillary lumen. Typical capillary internal diameter (ID) ranges from but is not limited to 50-250 μm. Moreover, the illuminated region will extend down the capillary axis defining an illuminated axial length ranging from but not limited to 2-8 mm. For a typical application, a 100 μm ID capillary with a 6 mm axial distance will comprise an illuminated volume of 47 nL. Should 50 μL of sample be desired for labeling, about 1,064 flashes will be needed, which will require many minutes to process and unnecessarily accelerate light source attrition. Moreover, under these conditions only a small fraction of the photolysis light is focused into the capillary lumen, as refractive focusing limits of both excimer laser and plasma light sources result in a beam waste that is larger than the lumen's internal diameter. As such, the capillary-based approach as previously taught result in a variety of shortcomings.

Opto-fluidic chip 205 comprises a serpentine photolysis zone 304 as detailed by photolysis zone 307. The fluidic path within photolysis zone 307 is arranged in a folded or serpentine manner, with adjacent flow channels closely juxtaposed and flow established in counter-current fashion. The serpentine photolysis zone enables better opto-fluidic matching between the photolysis light source 103 and the sample-reagent mixture, as the photolysis light can now be distributed over a broader incident area, overcoming refractive focusing limitations. Required fluence for incident UV irradiation to effectively photolyze labeling reagent is dependent upon UV source spectral irradiance and labeling reagent extinction coefficient. For $H_2O_2$ based labeling, fluence of at least 3 $mJ/mm^2$ for UV wavelengths less than 250 nm is typically required. For both OH and $CF_3$ radical labeling, flash photolysis light source 103 has sufficient spectral irradiance to enable illuminated areas of up to 16 $mm^2$. Under such conditions, fluidic channels 308 within photolysis cell 304 can be arranged to contain about 6.4 μL of illuminated volume. In this manner, the illuminated volume of photolysis zone 304 is 136 times greater than that of the afore described 100 μm ID capillary system, and as such, labeling will proceed in a small fraction of the time required for capillary based labeling, while concomitantly reducing strain of the photolysis system by greater than 99%.

Sample and labeling reagent mixture is illuminated by photolysis light source 103 in photolysis zone 304. After exposure, radicals are promptly formed and covalently modify the sample typically within a few microseconds. Labeled sample, buffer, and modified reagents are pumped down-stream to enter dosimetry zone 305. The contents of dosimetry zone 305 is probed using a photometric means such as but not limited to photometric absorbance, fluorescence, light scatter, refractive index detection, and/or chemiluminescence. Real-time measurements made in dosimetry zone 305 allow for a feedback loop in which photolysis conditions can be modified to assure that a desired amount of radical production occurs and a desired amount of in vitro analyte labeling transpires. During initial operation of the system, a base-line measurement of the photometric property of the dosimetry zone containing a mixture of unirradiated sample and reagent is taken. Once the baseline measurement is made, photolysis proceeds and the change in photometric property is determined. In the case of hydroxyl radical protein footprinting, OH radicals covalently label the sample while concomitantly attacking an internal standard radical dosimeter such as adenine as typically employed. In this case, the photometric property to be assessed is UV photometric absorbance at 265 nm. Upon OH radical attack, adenine demonstrates a decrease in UV 265 nm absorbance in a manner directly proportional to effective OH radical yield. During the fine-tuning process, effective OH radical yield is controlled by either altering flash intensity or $H_2O_2$ concentration in response to the difference between assessed and target change in dosimetry signal.

Should the actual response of the internal standard radical dosimeter be less than the desired level, the flash energy of photolysis light source 103 is increased until the desired level of dosimeter response is achieved. Alternatively, the relative pumping speed of reagent pump 207 is increased with respect to buffer pump 206, subsequently increasing the effective concentration of labeling reagent after mixing with sample within in-line mixer 204. Should the actual response of the internal standard radical dosimeter be greater than the desired level, the flash energy of photolysis light source 103 is decreased until the desired level of dosimeter response is achieved. Alternatively, the relative pumping speed of reagent pump 207 is decreased with respect to buffer pump 206, subsequently decreasing the effective concentration of labeling reagent after mixing with sample within in-line mixer 204.

Figure 4:
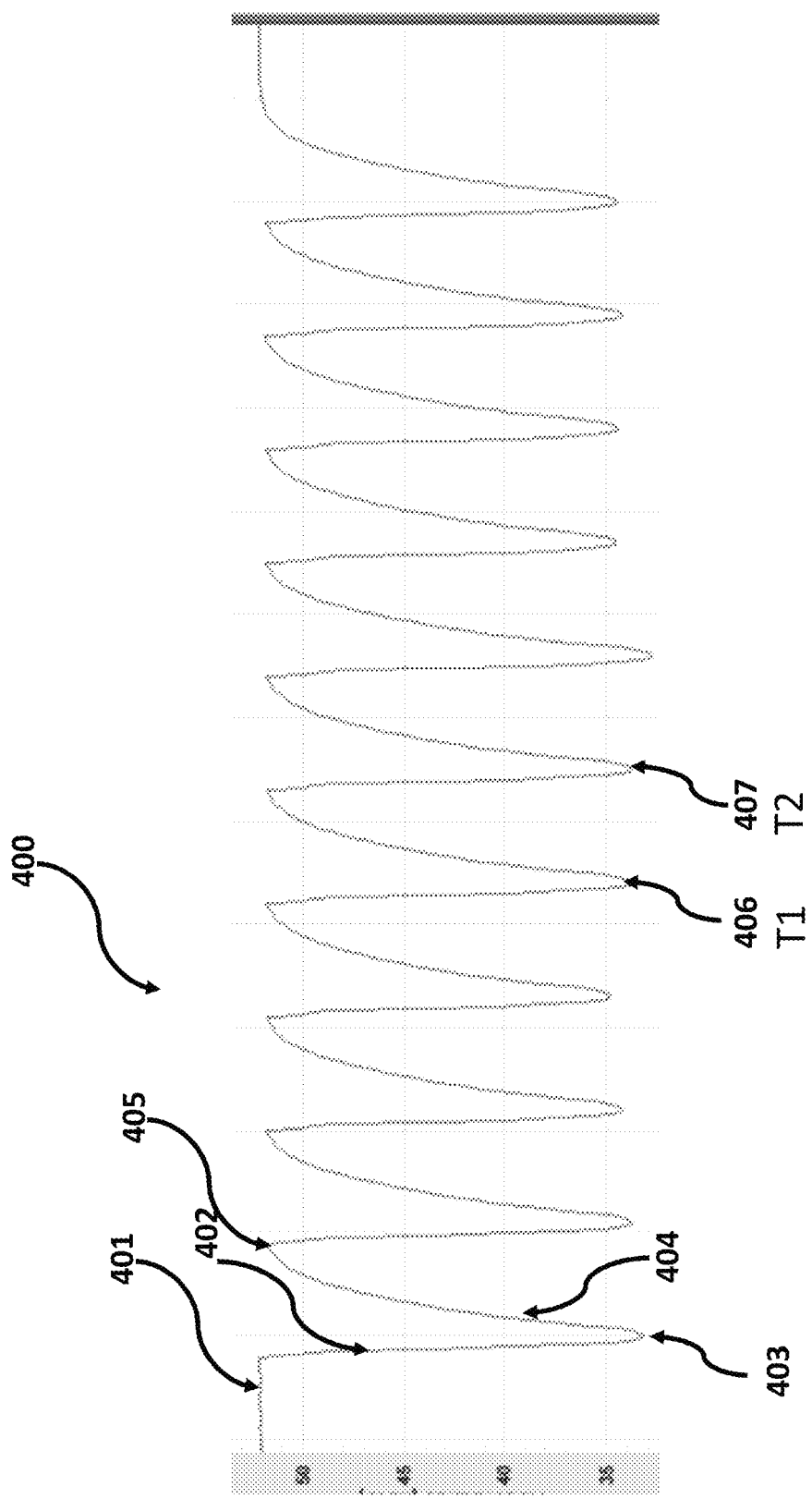
FIG. 4 illustrates in detail a dosimetry zone photometric response plot for a mixture of adenine and hydrogen peroxide as irradiated with a pulse of UV light at one second intervals.

FIG. 4 depicts the real-time output trace 400 of UV absorbance vs time as taken in dosimetry zone 305 during the generation of hydroxyl radicals in photolysis zone 304, employing a 1 Hz flash rate, using 100 mM $H_2O_2$ in the presence of 1 mM aqueous adenine, for which 2 mM aqueous adenine and 200 mM $H_2O_2$ were mixed 1:1 (v/v) in microfluidic mixer 303. Shown are: non-exposure baseline 401; descending shoulder 402; peak change in photometric response (minima 403), or in this case UV absorbance; rising shoulder 404; re-established baseline 405; minimum UV absorbance value achieved at time T1 406; and minimum UV absorbance value achieved at time T2 407. As obvious to those skilled in the art, other adenine/$H_2O_2$ mixing ratios may be employed to achieve the targeted concentration, and the 1:1 mixing ratio is meant to be illustrative and not restrictive in scope. The baseline UV photometric absorbance measurement for the unexposed afore described mixture is represented by non-exposure baseline 401. In non-exposure baseline 401 the baseline UV absorbance is taken to be about 55 milli-absorbance units (mAU) as determined against the background of running buffer, which in this case is water. Upon photo-irradiation of this mixture within photolysis zone 304, OH radicals are formed and subsequently oxidize the adenine. The photo-irradiation period is typically but not limited to 10 μsec. Hydroxyl radical reactions subsequently proceed for about another 1-5 μsec after which the reaction self-terminates. As the irradiated mixture flows from photolysis zone 304 and enters dosimetry zone 305, the photometric absorbance signal begins to decrease as shown in descending shoulder 402. The UV absorbance minima for the labeled sample is taken to be about 33 mAU as shown at minima 403. Here the effective change in adenine UV absorbance for the first irradiated bolus of mixture is determined to be 22 mAU as calculated by taking the difference between non-exposure baseline 401 and minima 403 (55 mAU-33 mAU). As the irradiated mixture flows out of dosimetry zone 305 the measured UV absorbance returns to its baseline as depicted by rising shoulder 404 and re-achieved baseline 405. The determined change in UV absorbance upon photo-irradiation is compared with the targeted change for the labeling experiment. Should the effective level of absorbance change deviate from the desired target, then the flash energy and/or $H_2O_2$ concentration is altered to adjust the OH radical yield using the previously described control-loop logic. Once the targeted level of internal standard dosimeter photometric property change is achieved, the photo-irradiation/dosimeter response assessment procedure is repeated until the desired amount of labeled sample is processed and subsequently collected.

During the labeling process, the effective change in dosimeter response may be optionally accessed for each flash cycle to determine reproducibility and inherent quality of the total labeling process. Under these conditions, the average, standard deviation, and percent relative standard deviation (RSD) for the effective dosimeter response for each flash cycle is taken and compared with a pre-established metric of quality. A typical RSD quality metric can be, but not limited to, less than 5%, as determined by specific photochemical labeling conditions for the target protein. Should the quality metric be achieved, then the labeling experiment is determined to be of acceptable quality. Should the quality metric fail to be achieved, then the labeling experiment is flagged as being questionable, and the experimentalist is appropriately alerted.

Each photo-exposed bolus of mixture is partitioned by a predetermined isolation volume, comprised of un-irradiated mixture that flows through photolysis zone 304 between successive flashes. The isolation volume is essential to ensure that each bolus of mixture is only photo-irradiated once, by effectively acting as a buffer zone to mitigate unwanted retrograde axial diffusion of irradiated sample back into the next bolus of sample to be photo-exposed as well as adjusting for laminar flow axial velocity differences. A useful isolation volume is that which ensures against unwanted double irradiation while concomitantly reducing unwanted dilution of labeled product. An exemplary desirous isolation volume target is taken to be that volume which dilutes the sample by about 10%.

The photometric response plot 400 shown in FIG. 4 can be used to compute the effective isolation volume by determining the difference in dosimeter response minima as created during OH radical attack of adenine. Other internal standard radical dosimeters such as Tris or histidine buffers will demonstrate increased photometric absorbance upon OH radical attack, and in this case the photometric response plot 400 will demonstrate local maxima. For this exemplary discussion, adenine is again used as the internal standard radical dosimeter. For adenine, two successively photo-irradiated boluses of mixture will comprise two respective effective dosimeter response minima as indicted by 406 and 407. The time difference between 406 (T1) and 407 (T2) can be calculated. For exemplary purposes, consider a time difference between T1 and T2 to be 1.25 seconds. For the previously described flash rate of 1 Hz, the flash interval is determined to be 1.0 second. In the adenine example, the isolation volume is determined by product of the net flow rate and the difference between the flash interval and dosimeter minima interval. In the adenine example, the net flow rate was 70 μL per minute or 1.17 μL per second. As such, the isolation volume is determined to be 1.17 μL/sec (1.25 sec)=0.29 μL. If the total exposure volume as dictated by the geometric properties of photolysis cell 304 is 3 μL, then the isolation volume is taken to be about 10% of the illuminated volume, and as such is determined to be sufficient to ensure single flash exposure of each bolus. Should the isolation volume be less than the desired goal, then the net flow rate may be proportionally increased or alternatively the flash rate may be proportionally decreased to achieve the desired isolation volume. Should the isolation volume exceed the desired goal, then the net flow rate may be proportionately decreased or alternatively the flash rate may be proportionately increased to achieve the desired isolation volume. In one embodiment the above noted control logic is automatically implemented by instrument controller 106.

Once appropriate dosimeter response and isolation volume have been achieved, the sample mixture can be confidently labeled, and the labeled product be collected. During the labeling and product collection process, instrument controller 106 notes the time at which dosimeter and isolation volume goals have been achieved and determines the arrival time of properly labeled product to the exit of inlet-outlet port 202. The arrival time is determined by the quotient of the transfer volume extending from dosimetry zone 305 to inlet-outlet port 202 and the net flow rate. Prior to the arrival of appropriately labeled product, the exiting contents of opto-fluidic chip 205 are dispensed through port 202 into a designated waste well 221. Under the control of instrument controller 106, upon the arrival of properly labeled product to the exit of inlet-outlet port 202, microplate 201 is moved by sample introduction system 101 so that labeled product is collected in product collection microwell 222.

In Vivo Photochemical Labeling

Figure 5:
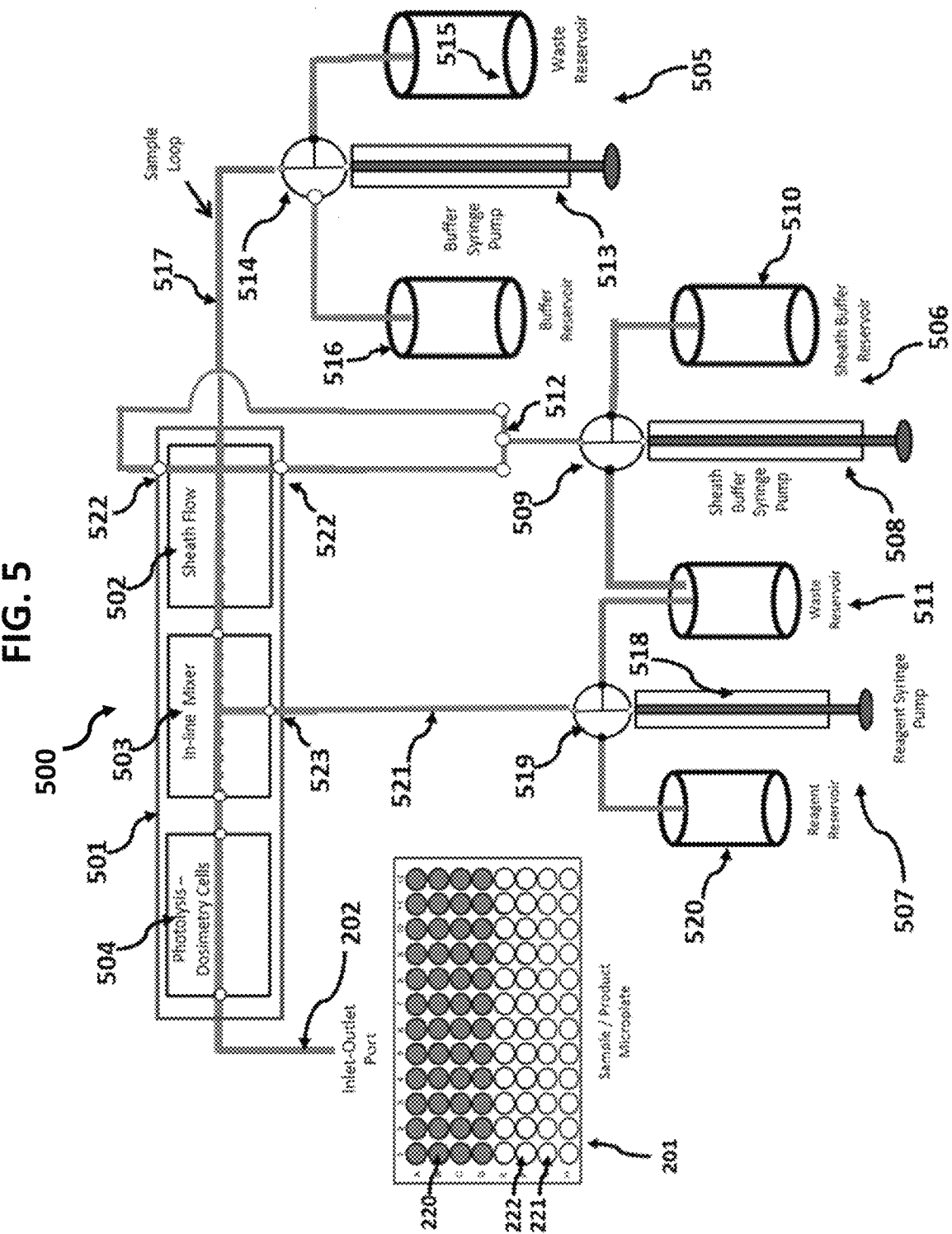
FIG. 5 illustrates embodiments of a microfluidic system.

The previous discussion described details of an embodiment of the present invention for the labeling an in vitro sample. Here we describe details for an embodiment that supports in vivo labeling reactions. FIG. 5 illustrates the microfluidic circuit 500 and opto-fluidic chip 501 for on-chip in vivo photochemical labeling. Shown are: microplate 201; sample inlet—product outlet port 202; cell containing microplate well 220; waste receiving microwell 221; product collection microwell 221; in vivo radical labeling opto-fluidic chip 501; sheath flow generator 502; in-line mixer 503; photolysis zone and dosimetry zone array 504; sample buffer microfluidic pumping system 505; sheath buffer microfluidic pumping system 506; reagent microfluidic pumping system 507; sheath flow buffer syringe pump 508; four-way microfluidic valve 509; sheath buffer reservoir 510; waste reservoir 511; sheath buffer tee 512; sample buffer syringe pump 513; four-way microfluidic valve 514; waste reservoir 515; buffer reservoir 516; sample loop 517; reagent syringe pump 518; 4-way microfluidic valve 519; reagent reservoir 520; reagent transfer line 521; sheath-flow inlet ports 522; and in-line mixer reagent introduction port 523.

Opto-fluidic chip 501 is comprised of three different functional zones: sheath flow generator 502, labeling reagent/sample in-line mixer 503, and photolysis and dosimetry cell array 504. Opto-fluidic chip 501 is connected to three different microfluidic circuits: buffer and sample fluidic system 505; sheath flow fluidic system 506; and reagent introduction fluidic system 507. Before labeling commences, all three fluidic systems are primed. System 505 is primed by the actions of buffer syringe pump 513 and valve 514. First valve 514 is configured to allow fluidic communication between buffer reservoir 516 and syringe pump 513. Pump 513 is filled with running buffer as aspirated from buffer reservoir 516. After filling, valve 514 is reconfigured to allow communication between syringe pump 513 and waste reservoir 515. Syringe pump 513 contents are pumped out to waste reservoir 515. This priming cycle is continued until all air within fluidic system 505 has been expelled and the remnants of any previous buffer has been washed out. Under typical circumstances, the cycle is repeated, but not limited to, three times. Syringe pump 513 is then refilled with running buffer and valve 514 is configured to enable fluidic communication between syringe pump 513 and opto-fluidic chip 501 via sample loop 517. Running buffer is then pumped through sample loop 517 and into opto-fluidic chip 501 by syringe pump 513, and the buffer flows through sheath flow generator 502, in-line mixer 503, photolysis and dosimetry zone array 504 and out to designated waste microwell 221 in microplate 201 via inlet-outlet port 202.

After priming system 505, sheath flow fluidic system 506 is primed. Valve 509 is configured to allow fluidic communication between sheath buffer syringe pump 508 and sheath buffer reservoir 510. For in vivo photo-chemical labeling, reservoirs 510 and 516 contain the same buffer. Sheath flow buffer is aspirated to fill sheath buffer syringe pump 508. After filling, valve 509 is reconfigured to allow fluidic communication between sheath buffer syringe pump 508 and waste reservoir 511. Waste reservoir 511 may be a shared with reagent introduction system 507. Moreover, reagent introduction system 507, microfluidic pumping system 506, and system 505 may optionally utilize the same waste buffer reservoir. Sheath buffer syringe pump 508 empties its contents into waste reservoir 511. This priming cycle is continued until all air within fluidic system 506 has been expelled and the remnants of any previous buffer has been washed out. Under typical circumstances, the cycle is repeated, but not limited to, three times. Sheath buffer syringe pump 508 is then refilled with sheath buffer and valve 509 is configured to enable fluidic communication between sheath buffer syringe pump 508 and opto-fluidic chip 501. Sheath flow buffer flow is split by coupling tee 512, which establishes two streams of sheath flow buffer that enters opto-fluidic chip 501 through ports 522 of sheath flow generator 502. Sheath flow buffer then flows through sheath flow generator 502, in-line mixer 503, photolysis and dosimetry zone array 504 and out to designated waste microwell 221 in microplate 201 via inlet-outlet port 202.

After priming system 505 and microfluidic pumping system 506, reagent fluidic system 507 is primed. Valve 519 is configured to allow fluidic communication between reagent reservoir 520 and reagent syringe pump 518. Reagent solution is aspirated to fill reagent syringe pump 518. After filling, valve 519 is reconfigured to allow fluidic communication between reagent syringe pump 518 and waste reservoir 511. Waste reservoir 511 may be shared with sheath buffer fluidic system 506. Moreover, reagent fluidic system 507, sheath buffer fluidic system 506, and system 505 may optionally utilize the same waste buffer reservoir. Reagent syringe pump 518 empties its contents into waste reservoir 511. This priming cycle is continued until all air within fluidic system 507 has been expelled and the remnants of any previous reagent solution has been washed out. Under typical circumstances, the cycle is repeated, but not limited to, three times.

Reagent syringe pump 518 is then refilled with reagent solution and valve 519 is configured to enable fluidic communication between reagent syringe pump 518 and opto-fluidic chip 501. Reagent solution is pumped through reagent transfer line 521 and enters opto-fluidic chip 501 through in-line mixer 503 reagent inlet port 523. Concurrent with the latter, fluidic systems 506 and 505 pump their fluidic constituents into opto-fluidic chip 501 as previously described. In this fashion, all fluid flow, including that from reagent fluidic system 507 is directed down the chip and ultimately out port 202 to waste microwell 221. The system is now ready for in vivo radical protein footprinting.

For in vivo radical protein footprinting, microwell 220 contains cells, tissues, or organisms suspended in buffer. While reagent microfluidic pumping system 507 and sheath buffer syringe pump 508 remain at rest, buffer syringe pump 513 is connected to sample loop 517 via valve 514. Buffer syringe pump 513 is used to aspirate cells from microwell 220. Cells are aspirated up port 202, through dosimetry zone array 504, in-line mixer 503, sheath flow generator 502, and ultimately into sample loop 517. Typically, a predetermined volume of cells as suspended in buffer is aspirated and stored within sample loop 517. As such, cells also remain through each compartment of opto-fluidic chip 501 as well as inside port 202. When labeling commences, fluidic systems 507, 506, and 505 initiate flow in a simultaneous fashion, ultimately pushing cells stored within sample loop 517 into opto-fluidic chip 501, where they get mixed with labeling reagent and subsequently photo-irradiated to initiate the photo-radical labeling process.

In order for cells to be singularly isolated from each other and not clumped or aggregated together when they are photo-irradiated, a sheath-flow is established within sheath flow generator 502, separating the cells by a small partitioning volume of sheath flow buffer. Under typical conditions, a sheath buffer flow rate is established to be, but not restricted to, ten times greater than that of the buffer syringe flow rate. As subsequently described, the flow rate ratio of fluidic systems 505 and 506 may be automatically adjusted to achieve a desired degree of cellular isolation. Concomitant with the pumping activity of fluidic systems 505 and 506, reagent fluidic system 507 delivers labeling reagent to mix with flowing cells within in-line mixer 503. As is the case for in vitro labeling, the relative flow rate of reagent fluidic system 507 to the net flow rate of sheath buffer syringe pump 508 and system 505 can be automatically adjusted in accordance with the concentration of the labeling reagent and the desired level of effective radical yield as determined by the inline radical dosimetry system.

Figure 6:
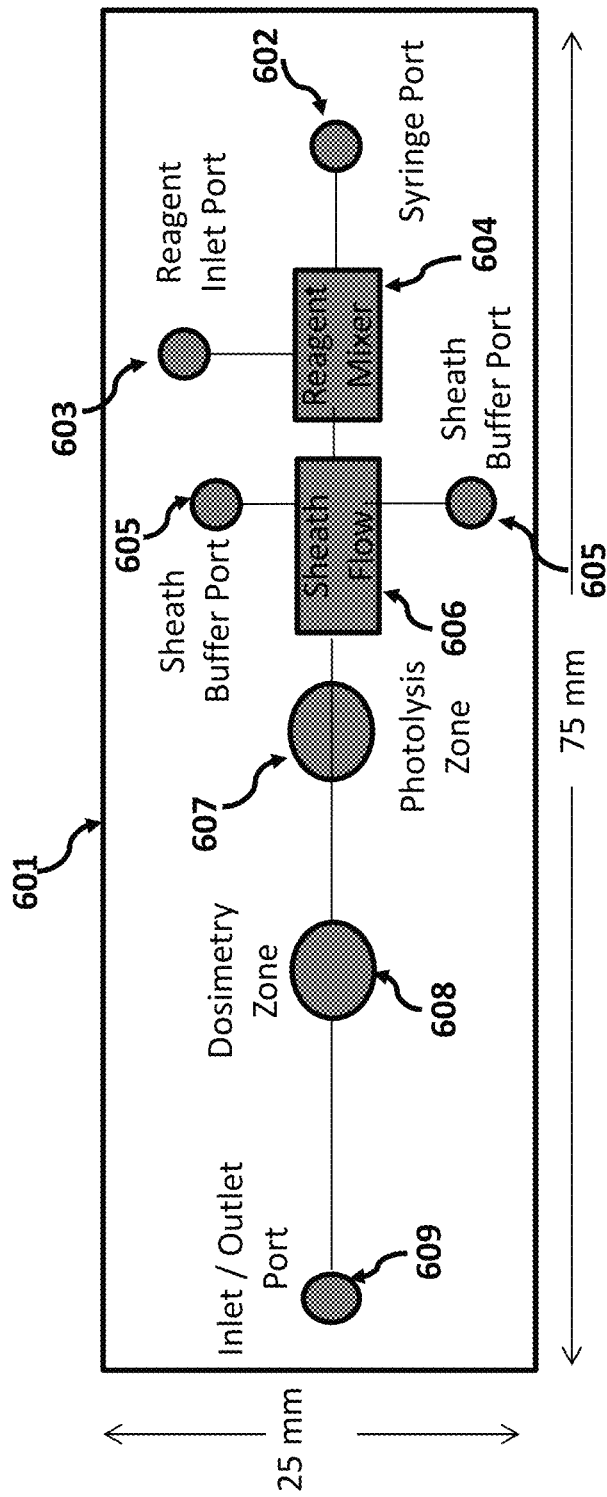
FIG. 6 illustrates a preferred embodiment of an in vivo opto-fluidic chip.

FIG. 6 depicts a detailed view of a preferred embodiment of opto-fluidic chip 601. Shown are: opto-fluidic chip 601; buffer syringe port 602; reagent inlet port 603; reagent mixer 604; sheath buffer inlet ports 605; sheath flow generator 606; photolysis zone 607; dosimetry zone 608; and sample inlet/product outlet port 609. In opto-fluidic chip 601, reagent mixer 604 precedes sheath flow generator 606. Cells enter opto-fluidic chip 601 via buffer syringe port 602. At this point, they are not isolated, but may enter as densely packed populations of cells or other in vivo embodiments. Upon entering reagent mixer 604, they are mixed with labeling reagent which enters buffer syringe port 602 via reagent inlet port 603. While a plurality of different in vivo labeling reagents may be used as known by those skilled in the art, for exemplary purposes we describe the use of hydrogen peroxide as used for in vivo hydroxyl radical protein footprinting. As described by Jones et al (Espino, J. A.; Mali, V. S.; Jones, L. M., In Cell Footprinting Coupled with Mass Spectrometry for the Structural Analysis of Proteins in Live Cells. *Analytical chemistry* 2015, 87 (15), 7971-7978.), hydrogen peroxide is rapidly and readily taken up by cells, or other in vivo entities, and quickly partitions into all cellular compartments. As will be subsequently described, the ultimate concentration of hydrogen peroxide used is fundamentally determined, in closed loop fashion, by determining effective hydroxyl radical yield as assessed by the change in photometric property of an internal standard radical dosimeter that is probed in dosimetry zone 607.

Prior to deposition into microwell 220, the internal standard radical dosimeter is added to the population of cells, or other in vivo embodiments, and this mixture is allowed to sufficiently incubate so that the internal standard radical dosimeter is taken up by all cells and ultimately achieves a homogeneous distribution between cells and within cellular compartments. Cells are then spun down to form a pellet and the supernatant fluid removed. The pellet of cells is then resuspended in buffer and again spun down a second time. This process is repeated until all extracellular internal standard radical dosimeter has been removed. Once devoid of extracellular internal standard radical dosimeter, cells are resuspended in buffer and ultimately transferred to well 220.

After passing through reagent mixer 604, the cell-reagent mixture enters sheath flow generator 606. The sheath flow generator 606 includes a cavity and sheath-flow buffer ports 605 for receiving sheath flow buffer, and together these components of the generator 606 are shaped and arranged to create hydrodynamic focusing such that cells are isolated by sheath flow buffer. The relative flow rates of microfluidic systems 505, 506, and 507 are adjusted so that the desired cell-to-cell isolation volume is established while concomitantly achieving the target intracellular hydroxyl radical yield. After passing through sheath flow generator 606, the isolated cell population enters photolysis zone 607 where they are irradiated with light that initiates the intra-cellular photo-labeling radical reaction. After passing through photolysis zone 607, cells enter dosimetry zone 608 where they are optically probed to assess effective radical yield, as well as inter-cellular distance and subsequent cell-to-cell partitioning volume.

During in vivo radical protein footprinting, intracellular internal standard radical dosimeter response is photometrically measured as probed through dosimetry zone 608. Typical photometric measurement means include but are not restricted to photometric absorbance, photometric luminescence, and photometric fluorescence. As it is desirable to detect the photometric signal generated within a single cell or other single in vivo embodiment, photometric fluorescence can be a preferred measurement means as its dynamic range and analytical sensitivity is typically superior to the other previously noted methods.

For in vivo radical protein footprinting, a fluorescence internal standard radical dosimeter would alter its fluorescence characteristics, such as excitation and emission properties, upon radical attack and ultimate covalent modification. Such alterations could involve changing the excitation and emission properties of the dosimeter so that it demonstrates an increase or decrease in fluorescence for a given excitation/emission wavelength setting. As it is desirable to maximize the sensitivity of radical dosimeter signal detection, detecting the presence of acquired fluorescence attributed to radical attack is a preferred embodiment for this approach, as it enables the detection of small signals upon a dark or zero background. The radical dosimeter fluorescence detector is configured using the specific excitation and emission wavelengths for the covalently modified internal standard dosimeter. When the dosimeter is in its native state, no fluorescence signal is detected. Upon radical attack, the fluorescence properties of the dosimeter are altered to correspond with the selected excitation and emission wavelengths, and the detected fluorescence signal intensity will be proportional to the concentration of the covalently modified internal standard dosimeter, which in turn is proportional to the effective radical yield.

FIG. 7 depicts five different internal standard radical dosimeters that, upon oxidation using hydroxyl radical attack, demonstrate fluorescence signals at the indicated excitation and emission wavelengths in a dose response manner. Table 700 lists the cellular distribution and fluorescence excitation and emission wavelengths for the following internal standard radical dosimeters that respond to hydroxyl radical attack in a dose-responsive manner: terepthalic acid; CellRox® Green; dichlorofluoroscein; CellRox Orange; and CellRox Deep Red. Also shown are the intracellular compartments in which each dosimeter predominantly distributes. The CellROX® dyes are commercially available from ThermoFisher (USA).

Figure 8:
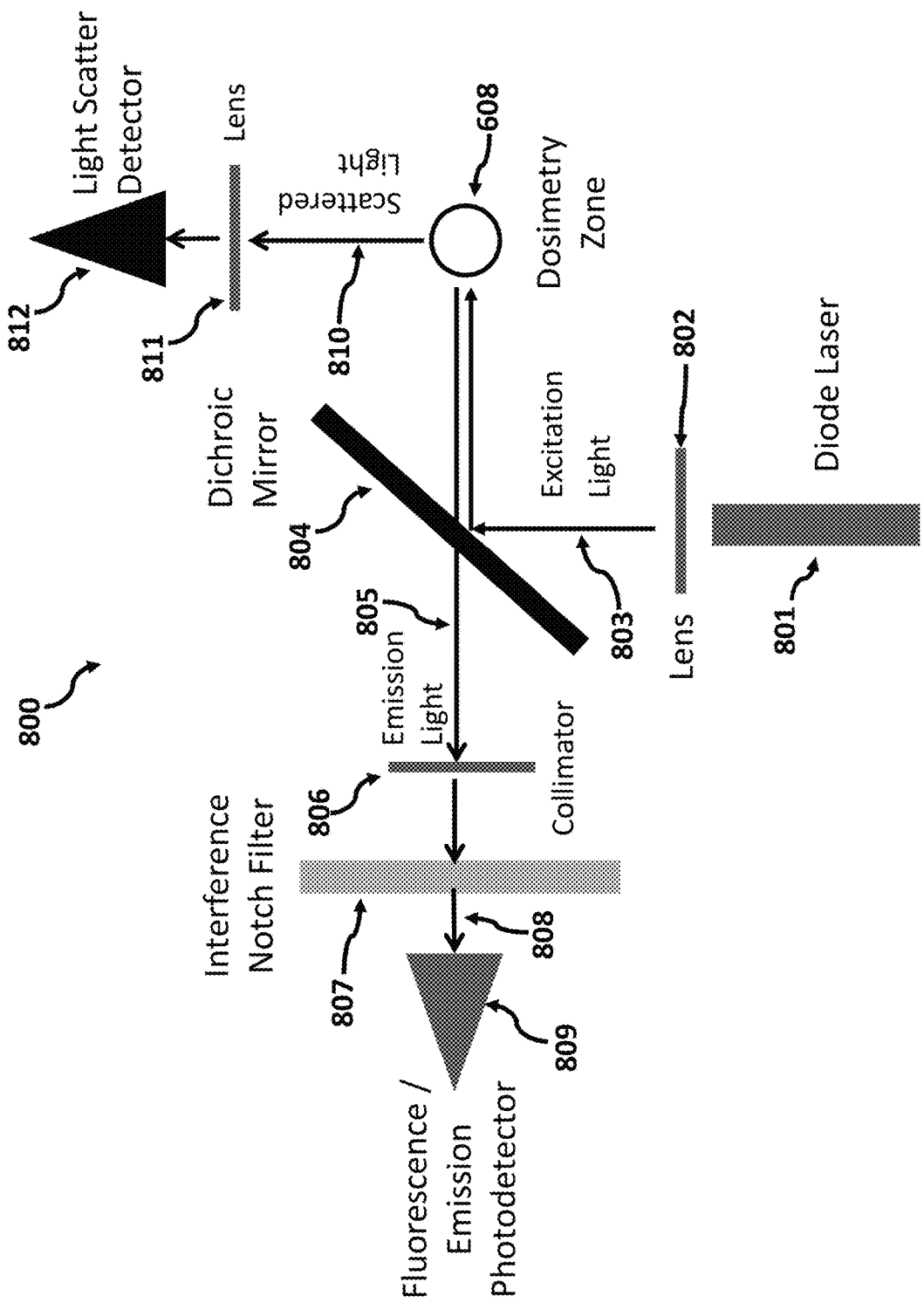
FIG. 8 depicts an embodiment of a combined fluorescence and light scatter detector system of the present invention.

FIG. 8 depicts an internal standard radical dosimeter photometric detector 800 embodiment of the present invention. Shown are: light source 801; focusing lens 802; excitation light 803; dosimetry zone 608; dichroic mirror 804; emission light 805; collimator 806; interference notch filter 807; narrow band emission light 808; fluorescence/emission photodetector 809; scattered light 810; collimator 811; and light scatter detector 812. Internal standard radical dosimeter photometric detector 800 is a combined fluorescence and light scatter detector system. As will be clearly obvious to those skilled in the art, this combined system could be replaced by two separate detectors (fluorescence and light scatter) and as such, the present embodiment is meant to be illustrative and not restrictive in scope. As in vivo elements enter dosimetry zone 608, they are illuminated by excitation light 803 from light source 801 as focused by lens 802 and directed into dosimetry zone 608 by dichroic mirror 804. Light source 801 may be a narrow band-width solid state UV source such as a UV light emitting diode (LED), as available from Q-Photonics (Ann Arbor, MI) or a compact, solid-state laser, as available from Thorlabs (Newton, NJ). Alternatively, light source 801 may be a solid state visible light source such as a visible LED, as available from Q-Photonics (Ann Arbor, MI), or compact solid state visible laser, as available from Thorlabs (Newton, NJ). Typical output power can range from, but limited to, 0.1-10 mW, and typical bandwidths can range from but not limited to 1 to 15 nm. The wavelength of light source 801 is selected to be an appropriate choice for the excitation wavelength of the employed in vivo internal standard radical dosimeter. A focusing lens assembly 802 is used to focus excitation light to a narrow beam on the order of, but not restricted to, 1-200 μmeters within the center of the dosimetry zone 608, creating the probed dosimetry zone. Dichroic mirror 804 is selected to efficiently reflect excitation light but transmits emission light 805 that arises from covalently modified internal standard dosimeter illuminated within dosimetry zone 608.

Emission light 805 is ultimately collimated by collimator 806 and then passes through interference notch filter 807 to produce narrow-band emission light 808 which strikes the fluorescence emission photodetector 809. Photodetector 809 may comprise a silicon photodiode such as the S1336-8BQ silicon photodiode available from Hamamatsu (Hamamatsu City, Japan). Alternatively, photodetector 809 may comprise a compact photo-multiplier tube (PMT) such as Micro PMT assembly H12400 available from Hamamatsu. Photodetector 809 output current is processed by a current to voltage (I to V) convertor to provide a voltage that is proportional to incident emission light intensity of the narrow-band emission light 808. Photodetector 809 output voltage is transmitted to control electronics 105, where an analog to digital converter (ADC) creates a digital signal that is ultimately transmitted to the instrument controller 106 where fluorescence calculations are performed.

When cells or other in vivo embodiments enter dosimetry zone 608, they elastically scatter excitation light 803. Due to the size difference between the incident excitation wavelength (nm) and in vivo entity size (μm), the scattered light 810 is preferentially detected orthogonally with respect to the incident excitation light. Scattered light 810 is collimated by collimator 811 and ultimately strikes scatter photodetector 812. For a given excitation light intensity, the measured intensity of scattered light will be proportional to the size and number of in vivo entities located within the dosimetry zone 608 probed volume. As scattered light detection is being performed in an orthogonal direction with respect to incident excitation light, background scatter is also measured. In the absence of in vivo entities, the elastic and inelastic scatter of probed volume contents, as well as elastic scatter from radical dosimeter optical surfaces, are extraordinarily low thus creating a very low background signal. The light scatter signal is uniformly created irrespective of any inherent fluorescence, and as such can detect the presence of cells or other in vivo embodiment without any internal standard radical dosimeter signal.

Scatter photodetector 812 may comprise a silicon photodiode such as the S1336-8BQ silicon photodiode available from Hamamatsu (Hamamatsu City, Japan). Alternatively, photodetector 812 may comprise a compact photo-multiplier tube (PMT) such as Micro PMT assembly H12400 available from Hamamatsu. The scatter photodetector 812 output current is processed by a current to voltage (I to V) convertor to provide a voltage that is proportional to the incident scatter light 810. The photodetector 812 output voltage is transmitted to control electronics 105, where an analog to digital converter (ADC) creates a digital signal that is ultimately transmitted to the instrument controller 106 where light scatter calculations are performed.

Figure 9:
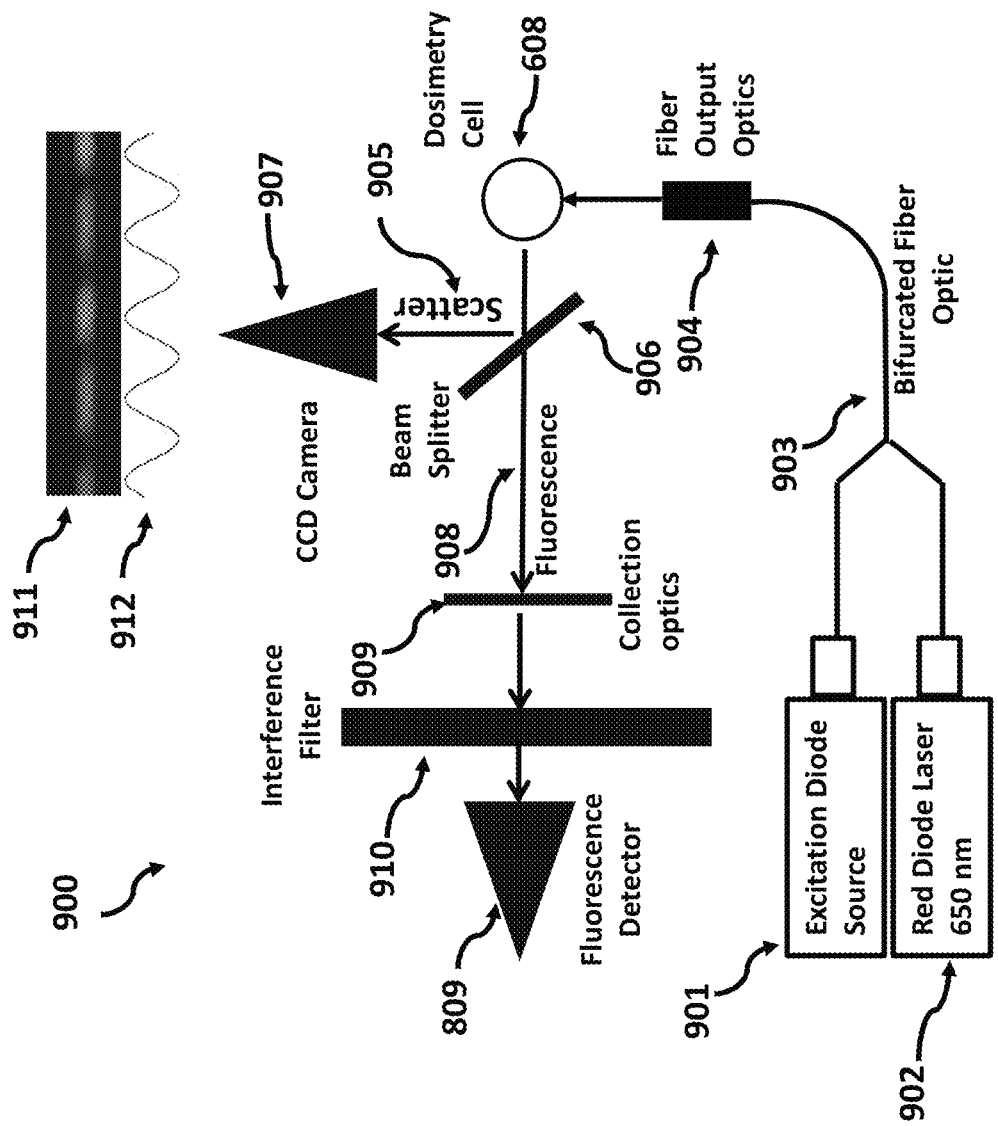
FIG. 9 depicts an alternate embodiment of a combined fluorescence and light scatter detector of the present invention.

FIG. 9 depicts another embodiment of an internal standard radical dosimeter photometric detector 900 of the present invention. Shown are: fluorescence excitation light source 901; red diode laser interference pattern light source 902; light collecting and transmitting bifurcated optical fiber 903; fiber output coupling optics 904; dosimetry cell 608; scattered light train 905; optical beam splitter 906; light scatter charged coupled device camera 907; fluorescence light train 908; fluorescence collection optics 909; fluorescence light selection interference filter 910; fluorescence detector 809; far field interference fringe pattern 911; and extracted spatial frequency 912.

In combined fluorescence and light scatter detector system 900, light sources may be interchanged to match fluorescence internal standard radical dosimeter requirements and where light scatter detection is achieved using a 2-dimensional charged couple device (CCD) imaging camera that images the interference pattern created by the dosimetry cell. Fluorescence excitation source 901 and red diode interference pattern light source 902 are remotely located from opto-fluidic chip 601 and coupled to dosimetry cell 608 using a bifurcated optical fiber 903 and requisite fiber optic coupling optics 904. The wavelength produced by light source 901 is selected to match the excitation wavelength requirements of the employed internal standard radical dosimeter. Red diode interference pattern light source 902 uses a red diode laser at 650 nm to create an optical interference pattern that is created in the far optical field of dosimetry cell 608. In such configuration the sources 901 and 902 can be mounted to the instrument's exterior, providing a facile means to interchange light sources as radical dosimetry objectives require.

Coherent light from the sources 901 and 902 become homogenized within single mode fiber optic 903 and are directed to strike dosimetry cell 608. Beam splitter 906 is used to divide the light exiting dosimetry cell 608 creating two optical trains: scatter train 905 and fluorescence train 908. Light scatter train 905 is created in the optical far field of dosimetry cell 608. As red diode interference pattern light source 902 is a coherent light source, its modality interacts with the optical properties of dosimetry cell 608 to create far field interference fringe pattern 911 as imaged by charged couple device, two-dimensional camera 907.

Fluorescence train 908 is collected and collimated by collection optics 909, which directs the light to transmit through interference filter 910. The band-pass characteristics of interference filter 910 are selected to match the internal standard radical dosimeter emission spectra. Interference filter 910 optical bandwidth can be, but not limited to 10 nm. Interference filter 910 is housed in a simple-to-remove mount that is user accessible, as interference filter 910 and fluorescence excitation source 901 are interchanged as a matched pair to accommodate a plurality of different internal standard radical dosimeters such as those listed in table 700. Fluorescence emission light is detected by fluorescence detector 809.

As cells enter dosimetry cell 608, they elastically scatter the light of red diode laser interference pattern light source 902, and such scatter changes the mean polarizability of the light, which in turn alters the refractive index and resultant phase of the light exiting the probed region. As the refractive index of the probed region shifts, imaged fringes 911 positionally shift, to the right or the left depending upon the refractive index change. By summing the intensity of each vertical pixel of two-dimensional camera 907 for a given horizontal or x increment, the fringe pattern of optical interference pattern 912 is represented as spatial frequency distribution. Using a fast Fourier transform (FFT), a phase of the dominant spatial frequency found in optical interference pattern 912 can be calculated at fast temporal intervals. As cells enter dosimetry cell 608, attendant light scatter alters fringe positions, which in turn is displayed as a change in phase. The phase change will be proportional to the size and number of cells within the probed region of dosimetry cell 608. As previously discussed, sheath flow generators 502 and 606 may function to isolate introduced cells or other in vivo embodiments so that they are distinctly separated and not clumped together, making for effective and consistent irradiation of each entity within the radical labeling photolysis zone. Controlled isolation of these in vivo entities is affected by the differential pumping speeds of sheath buffer syringe pump 508 and buffer syringe pump 513. Nominally the pumping speed of sheath buffer syringe pump 508 is, for example but not restricted to, ten times that of buffer syringe pump 513. As further described herein, the effective isolation of each in vivo entity may be assessed by determining the temporal difference in detected light scatter signals, which will maximize when an in vivo entity is illuminated and will minimize in the absence of said entity in a manner akin to the signal profile illustrated in FIG. 4. In the present embodiment, a light scatter detector is employed to assess the presence of in vivo entities. In an alternative embodiment, the light scatter detector is replaced with a refractive index detector, which determines the change in phase of detected light that arises from elastic scatter.

Once the desired cell or in vivo entity isolation is achieved, radical labeling proceeds much like that performed for in vitro experiments. The effective radical dose is assessed by monitoring the change in fluorescence signal measured in dosimetry zone 608 as in vivo entities are illuminated in the photolysis zone 607.

Figure 10:
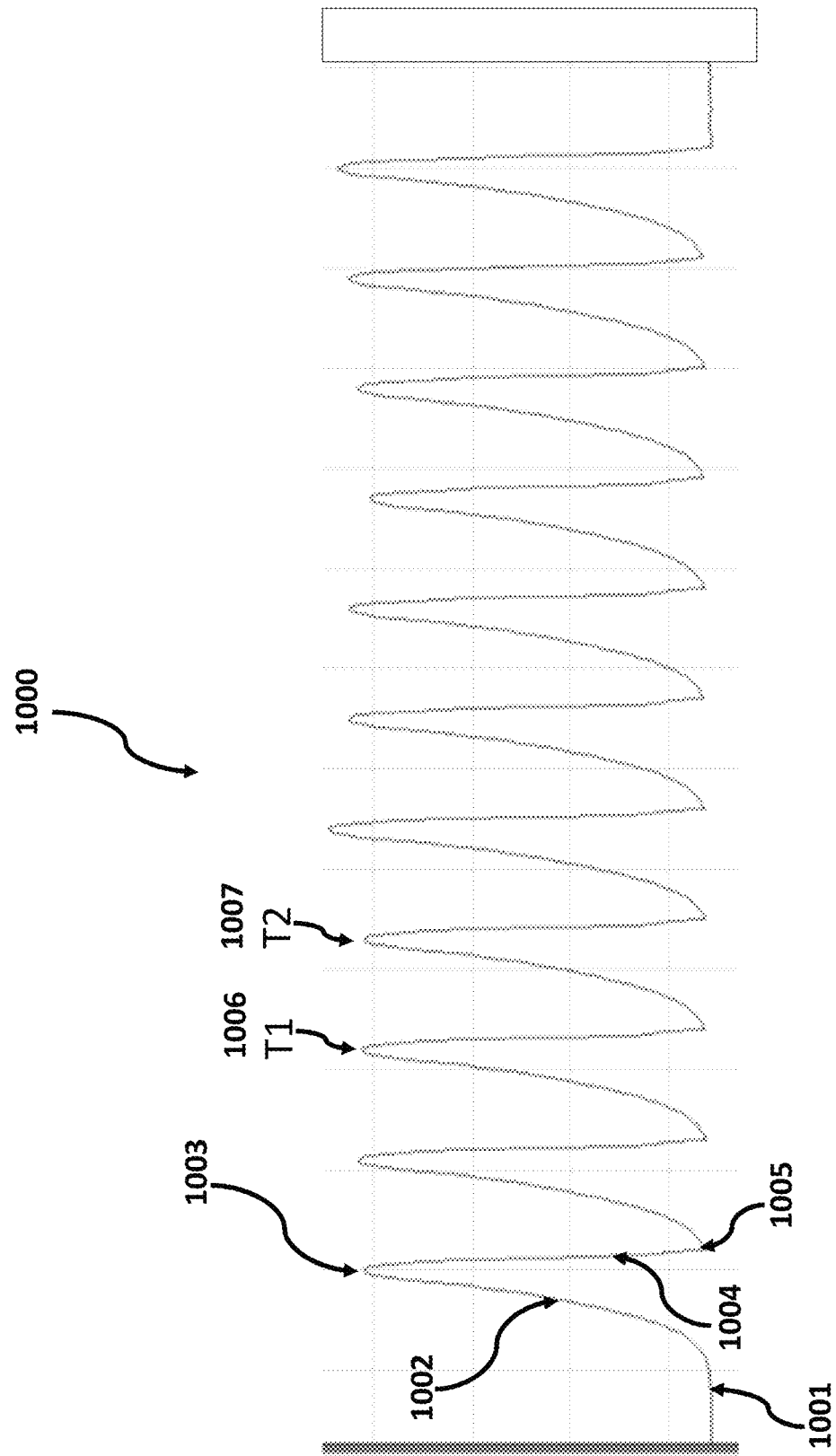
FIG. 10 illustrates the fluorescence radical dosimetry response while irradiating in vivo embodiments using CellRox® Deep Red and hydrogen peroxide in the present invention.

FIG. 10 depicts the radical dosimetry response 1000 using CellRox® Deep Red and a 100 mM concentration of hydrogen peroxide. Shown are: base line fluorescence level 1001; ascending shoulder 1002 of the dosimeter fluorescence signal; maximum dosimeter fluorescence level 1003; descending shoulder of dosimeter signal 1004; re-established base line fluorescence level 1005; maximum fluorescence level 1006 occurring at time T1; and maximum fluorescence level 1007 occurring at time T2. As shown, the baseline fluorescence dosimeter signal 1001 rapidly gives way to an ascending shoulder 1002 and maximizes at fluorescence level 1003 as the mixture is pulse irradiated. As the oxidized CellRox Deep Red exits the dosimetry zone, the fluorescence signal decreases as shown by descending shoulder 1004 and ultimately re-establishes its low background fluorescence baseline at 1005.

Analogous to in vitro radical labeling, the time difference between two maximum fluorescence values for two consecutively exposed boluses of cells or in vivo embodiments as illustrated by 1006 (T1) and 1007 (T2) can be used to assess the isolation volume as well as the cell-to-cell separation distance that is created by sheath flow generator 606. Akin to in vitro systems, the reproducibility of all maximum fluorescence signals may be assessed to evaluate the quality and reproducibility of the resultant in vivo radical labeling.

Once an appropriate dosimeter response and an in vivo entity isolation volume have been achieved, the in vivo entities can be confidently labeled, and the labeled in vivo products can be collected. During the labeling and product collection process, instrument controller 106 notes the time at which dosimeter and isolation volume goals have been achieved and determines the arrival time of properly labeled product to the exit of inlet-outlet port 202. The arrival time is determined by the quotient of the transfer volume extending from dosimetry zone 608 to inlet-outlet port 202 and the net flow rate. Prior to the arrival of appropriately labeled product, the exiting contents of opto-fluidic chip 601 are dispensed through inlet-outlet port 202 into a designated waste well 221. Under the control of instrument controller 106, upon the arrival of properly labeled product to the exit of inlet-outlet port 202, microplate 201 is moved by sample introduction system 101 so that labeled product is collected in product collection microwell 222.

Post-Labeling Analysis

For both in vivo and in vitro radical footprinting experiments, post-labeling analysis typically follows during which collected samples are optionally analyzed using an analyzer. The analyzer is configured to perform chemical analysis of the samples. For example, the analyzer may be configured to identify proteins, peptides, carbohydrates, metals, nucleic acids, lipids, and/or amino acids oxidized in the photolysis zone. The analyzer may include, for example, a mass spectrometer, scintillator, electrophoresis device, chromatograph, and/or any other device configured to separate and/or identify sample constituents based on radioactivity, mass, charge, size, or other property. In some embodiments, the analyzer is configured to detect isotopic or radio isotopic labels within cells or other biological entities and optionally to determine whether the components including such labels have been oxidized. In some embodiments, the analyzer is configured to measure a ratio of labeled/non-labeled concentrations of a particular component. In some embodiments, the analyzer is "in-line" with port 202 and thus configured to receive and analyze samples in real-time. For example, port 202 may include a capillary configured to provide sample directly to an input of a mass spectrometer.

Specific Control of Sheath Flow

Various embodiments of the invention include methods of determining and controlling cell-to-cell isolation volume to enable reproducible in vivo radical dosimetry. For in vivo radical dosimetry to be effectively implemented, photometric measurements of an internal standard radical dosimeter should be performed when the in vivo entity or entities are present within the dosimetry zone, to enable meaningful comparative measurements that represent differences in cell-to-cell, intracellular radical dosimeter response.

Figure 11:
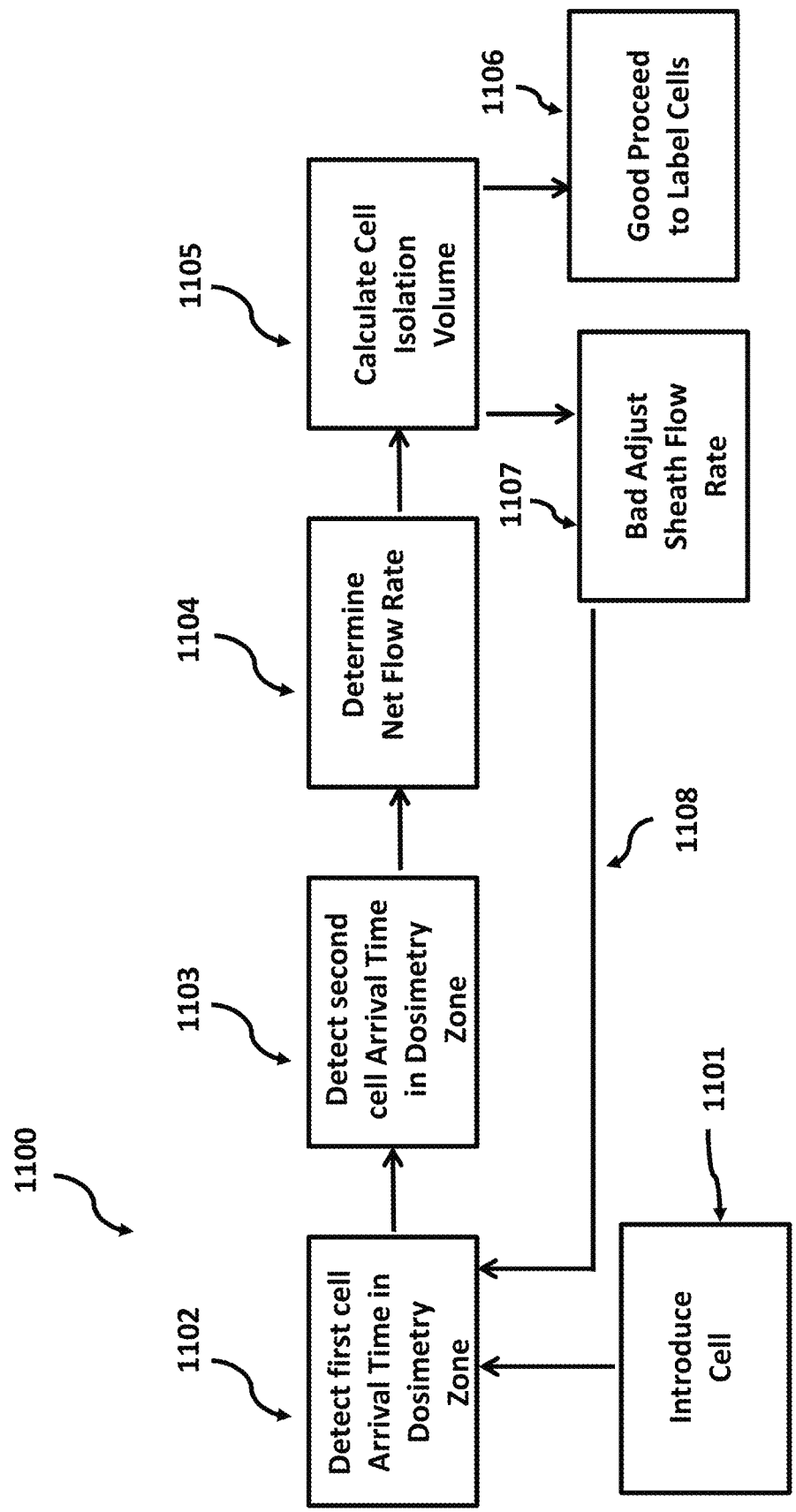
FIG. 11 illustrates an exemplary process to determine and control isolation volume or cell-to-cell distance in the present invention.

FIG. 11 depicts an exemplary method 1100 of determining and controlling cell-to-cell isolation volume using the described invention herein that further enables the detection of in vivo entities within the dosimetry zone. Shown are: cell introduction step 1101; first cell detection step 1102; second cell detection step 1103; net flow rate determination step 1104; cell isolation volume determination step 1105; good isolation assessment step 1106; bad isolation and sheath flow rate adjustment step 1107; and repeat cycle 1108.

In an introduce cell step 1101, a single file array of cells is formed and flows into dosimetry zone 608. In a detect first cell step 1102 a signal from scatter photodetector 812 is monitored to detect the arrival time of the first cell into the dosimetry zone 608. Upon the arrival of a cell or other in vivo biological entity within the dosimetry zone 608, the intensity of scattered excitation light 810 increases in accordance with the in vivo entity size and number of in vivo entities within the probed region. In a detect second cell step 1103 the process described above is used to detect the arrival time of a second cell into the dosimetry zone 608. The net flow rate for the system is calculated 1104 by summing the pumping speeds of syringe pump 508, syringe pump 513, and syringe pump 518. The flow rate can be reduced to the point where the time between detection of the first cell and the second cell is long enough to reduce the probability that two cells will be in the dosimetry zone 608 at the same time. This achieves single cell isolation in which the conditions allow the irradiation and oxidation of one cell at a time.

In a calculate cell isolation volume step 1105, the cell-to-cell isolation volume is determined by multiplying the arrival time difference between the first and second cells by the net flow rate 1104. If the empirically determined cell isolation volume deviates by less than +/−5% (or some other predetermined limit) from the desired isolation volume (which is directly related to a separation distance and separation time), then the system proceeds to label additional cells without further adjustment in a proceed step 1006. Optionally, should the empirically determined cell isolation volume deviate by greater than +/−5%, sheath flow syringe pump 508 pumping speed is altered, in an adjust sheath flow rate step 1107, to achieve the desired cell isolation target volume 1107 and the determination process repeated 1108 until target cell isolation volume is achieved.

Various embodiments include systems and method for detecting the presence of in vivo entities within dosimetry zone 608. The detected time of entry and exit of an in vivo entity within the dosimetry zone 608 may be used to determine the data acquisition period for photometrically determining intracellular dosimeter internal standard radical response. Upon entrance into the dosimetry zone 608, the in vivo entity causes a rapid rise in the intensity of scattered light as detected by scatter photodetector 812. Concordantly, upon in vivo entity exit, the intensity of scattered light as detected by scatter photodetector 812 precipitously drops. The time difference between the rise and drop of scattered light intensity represents the dosimetry zone dwell period of the in vivo entity, e.g. a cell. During the dwell period, light intensity values as detected by emission photo-detector 809 are summed and/or integrated to determine the net dosimetry signal for the in vivo entity of interest. By employing this approach, photometric dosimetry may be performed by detecting signals that arise from intracellular and/or extracellular photometric signals, while rejecting any inherent background signal that arises from the extracellular fluid for regions devoid of in vivo entities. As such, the majority of the measured photometric signal will be comprised of that which arises from intracellular components, as the background single for extracellular fluid is, by experimental design, substantially lower than that of intracellular fluid, and measurements are exclusively taken in the presence of an in vivo entity or entities.

Determination of In Vivo Embodiment Viability

Some embodiments include systems and methods for determining the viability of in vivo entities. For a given in vivo entity, scattered light intensity will be proportional to the size and number of in vivo entities present within dosimetry zone 608 during photometric assessment. Using the methodology disclosed herein, means to effectively ensure a constant arrival rate of in vivo entities within the dosimetry zone 608 is described. Under such circumstances, the number of in vivo entities for each data acquisition period can be constantly controlled, rendering the variation in measured scattered light to be vastly dependent upon changes in in vivo entity size. Changes of in vivo entity size can be attributed to inherent morphological variation or can be indicative of artifactual alteration in cellular/species morphology, which may be indicative of cellular disruption, cell death, or cellular apoptosis. As the inherent goal of in vivo HRPF is to assess biomolecular complement HOS under viable conditions, it is desirable to detect and signal the presence of inviable processes and/or conditions.

Embodiments of the invention described herein provide systems and methods to detect the potential harm to in vivo moieties that may arise from the HRPF protocol, and as such provides a means by which in vivo HOS analysis can be performed for viable and not disrupted in vivo entities. For example, a disrupted cell or the presence of more than one cell within the dosimetry zone 608 at the same time can be detected based on the measured light scattering. These detected entities under these circumstances may be separated from entities that were not irradiated under these conditions and discarded.

Controlled Triggering of Flash Photolysis Light

Various embodiments of the invention include systems and methods for triggering the flash photolysis light source 103 in sync with arrival of an in vivo entity into the photolysis zone 102. In vivo radical footprinting ideally includes determining and quantitating the presence of an in vivo entity within the photolysis zone in order to reliably irradiate said entity or entities in a reproducible manner and to photo-catalytically create a reproducible, intracellular radical load.

Figure 12:
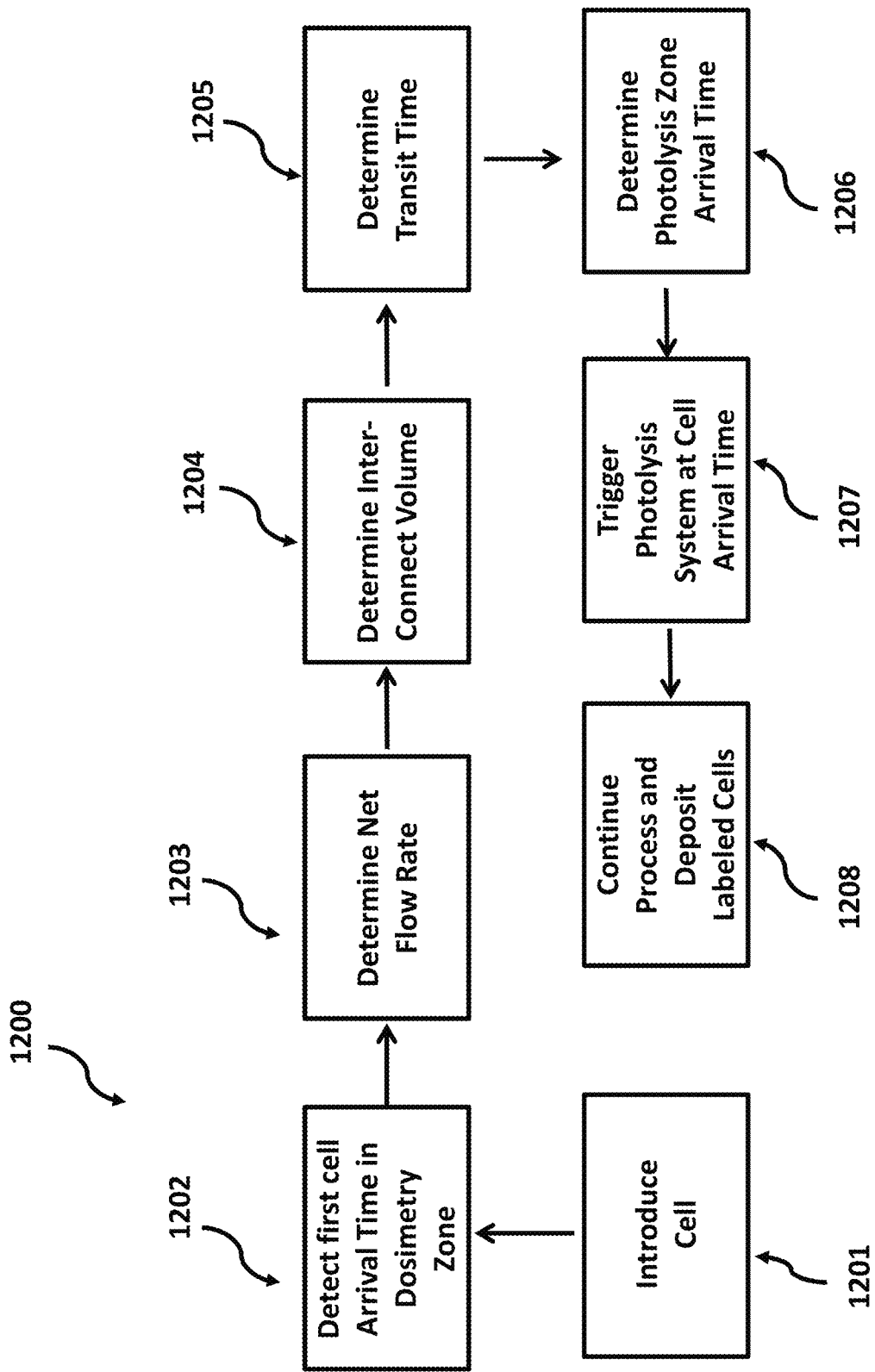
FIG. 12 depicts an exemplary process 1200 for cell arrival determination with concordant coordination of photolysis light triggering.

FIG. 12 depicts an exemplary method 1200 of determining the arrival of an in vivo entity into the photolysis zone 608, while providing systems and methods by which the flash photolysis light source 103 is precisely triggered to flash upon the arrival of the in vivo entity into the photolysis zone 608. Show are: cell introduction step 1201; first cell detection step 1202; determination of net flow rate 1203;

determination of on-chip interconnect volume 1204; determination of transit time 1205; determination of photolysis zone arrival time 1206; activation of photolysis trigger upon cell arrival time 1207; and continuation of the process with deposition of properly labeled cells 1208.

In an introduce cell step 1201 a single-file array of cells is formed as described elsewhere herein, and a first cell is introduced into photolysis zone 102. In a detect step 1202 the output signal of scatter photodetector 812 is monitored to detect the arrival time of the first cell into the dosimetry zone 608. Upon the entrance of a cell or other in vivo entity within the dosimetry zone 608, the intensity of scattered light increases in accordance with the in vivo entity size and number of in vivo entities within the probed region. This increase is detected by scatter photodetector 812. In a determine net flow rate step 1203, the net flow rate for the system is calculated by summing the pumping speeds of syringe pump 508, syringe pump 513, and syringe pump 518. In a determine interconnect volume step 1204, as a direct manifestation of the microfluidic system design, the interconnect volume that extends from the photolysis zone 102 and the dosimetry zone 608 is determined and remains constant during the in vivo radical protein footprinting process. In a determine transit time step 1205, the transit time required for an in vivo entity to travel from the photolysis zone 102 to the dosimetry zone 608 is calculated by dividing the interconnect volume by the net flow rate. In a determine photolysis zone arrival time step 1206, the photolysis zone arrival time is calculated by determining the difference of the dosimetry zone arrival time and the photolysis zone to dosimetry zone transit time. In a trigger step 1207, for subsequent cells or in vivo entities, the photolysis system is triggered to flash at the determined photolysis zone arrival time or a consistent interval thereafter. In a continue process step 1208, additional labeled cells are deposited within labeled cell reservoir 221 until a target number of cells has been processed.

While the teachings herein describe particular utility of detection signals that arise from light scatter photodetector 812 and fluorescence/emission photodetector 809, it will be obvious to those of ordinary skill in the art that these detectors can be used for the purpose of detecting in vivo entity arrival into the dosimetry zone 608 or for the purpose of predicting the arrival of an in vivo entity into the photolysis zone 102 by a plurality of undescribed combinations or means. For example, signals generated at fluorescence/emission photodetector 809 could be summed in temporal coherence with those from light scatter photodetector 812 to improve the overall sensitivity to detect the presence of an in vivo entity within the dosimetry zone. As such, the methodologies described herein are intended to be exemplary and not restrictive in scope.

Radical Dosimetry Closed Loop Control

Various embodiments of the invention include systems and methods of calibrating a closed-loop control radical dosimetry system. In these embodiments, the closed-loop control radical dosimetry system comprises calibration logic that is used to predict the required change in optical fluence or radical reagent concentration in response to measured radical dosimeter photometric fluorescence change. The calibration function is empirically determined through a plurality of measurements for which a known or control mixture of supporting buffer, in vivo entity, and radical dosimeter are treated with a single flash of light for each distinct control aliquot at various fluence or radical reagent concentration levels. In an exemplary embodiment, a software routine running in either the low level instrument control or high level user interface programs (e.g., control electronics 105 and/or instrument controller 106), generates a look-up table or curve fit that describes the measured change in dosimeter photometric fluorescence at each fluence or radical reagent concentration, allowing for the creation of a mathematical expression, or calibration function, that describes the relationship between applied fluence and/or radical reagent concentration and measured dosimeter fluorescence change for a single flash exposure. In another embodiment, the look-up table and subsequent calibration function is manually generated by the user employing fluorescence change values for each flash voltage value and/or radical reagent concentration.

During in vivo radical protein footprinting processing, background radical scavenging is assessed via dosimetry. The measured change in dosimeter photometric fluorescence is compared to a user specified targeted change. When the measured dosimeter value deviates by +/−10% or more from the target value, the applied fluence or radical reagent concentration is altered to achieve the targeted change of measured dosimeter absorbance. The above calibration function is used to predict the required change in fluence or radical reagent concentration.

It should be apparent to those skilled in the art that many more modifications besides those already described are possible without departing from the inventive concepts herein. The inventive subject matter, therefore, is not to be restricted except in the spirit of disclosure. Moreover, in interpreting the disclosure, all terms should be interpreted in the broadest possible manner consistent with the context. In particular, the terms "comprises" to and "comprising" should be interpreted as referring to elements, components, or steps in a non-exclusive manner, indicating that the referenced elements, components, or steps may be presented or utilized, or combined with other elements, components, or steps that are not expressly referenced.

While biological cells are used herein to illustrate various embodiments of the invention, in alternative embodiments, the "cells" may be replaced, in any examples or claims, by other entities such as non-biological entities, biological entities, viruses, multi-cellular organisms (e.g., fungi, spores, nanobes, molds, algae, nematodes, amoeba, protozoa, *Trichoplax adhaerens* or yeasts) or non-biological materials.

The general structure and techniques, and more specific embodiments which can be used to effect different ways of carrying out the more general goals are described herein. Although only a few embodiments have been disclosed in detail above, other embodiments are possible and deemed to be encompassed within this specification. The specification describes specific examples to accomplish a more general goal that may be accomplished in another way. This disclosure is intended to be exemplary, and the claims are intended to cover any modification or alternative that might be predictable to a person having ordinary skill in the art.

The logic discussed herein can include electronic circuits, hardware, firmware, and/or software store on a non-transient computer readable medium.

Only those claims which use the words "means for" are intended to be interpreted under 35 USC 112, six paragraph. Moreover, no limitations from the specification are intended to be read into any claims, unless those limitations are expressly included in the claims. The computers described herein may be of any kind of computer, either general purpose, or some specific purpose computer such as a workstation or laboratory or manufacturing equipment. The computer may be an Intel (e.g., Pentium or Core 2 duo, i3 etc.) or AMD based computer, running Windows 10, 8, 7, or Linux, or may be a Macintosh computer. The computer may also be a hand-held computer such as a PDA, cellphone, tablet, or laptop, running any available operating system including Android, Windows Mobile, iOS, etc.

Copyright Notice: Pursuant to 37 C.F.R. 1.71(e), a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

What is claimed:

1. An opto-fluidic chip for radical protein footprinting comprising:
    a substrate;
    a first port, a second port, and a third port each defined into the substrate;
    a mixing zone comprising a first cavity defined within the substrate and in fluid communication with both the second and third ports, wherein mixing is performed within the first cavity;
    a photolysis zone comprising a second cavity defined within the substrate and in fluid communication with the mixing zone, the second cavity being bounded by first and second opposing transparent sides, the second cavity comprising a channel configured in a serpentine pattern, wherein photolysis is performed within the second cavity; and
    a dosimetry zone comprising a third cavity defined within the substrate and in fluid communication with the photolysis zone and in further fluid communication with the first port, the third cavity being bounded by first and second opposing sides wherein one of the first and second sides of the third cavity is optically transparent, and wherein contents of the third cavity are photometrically probed; wherein
    the photolysis zone is arranged between the mixing zone and the dosimetry zone.

2. The opto-fluidic chip of claim 1 wherein the substrate comprises a plastic.

3. The opto-fluidic chip of claim 1 wherein the substrate comprises quartz.

4. The opto-fluidic chip of claim 3 wherein the substrate comprises a middle layer of silicon, a top layer of quartz, and a bottom layer of quartz, the middle layer being disposed between the top and bottom layers.

5. The opto-fluidic chip of claim 3 wherein the substrate comprises a middle layer of silicon, a top layer of fused silica, and a bottom layer of fused silica, the middle layer being disposed between the top and bottom layers.

6. The opto-fluidic chip of claim 1 further comprising a sheath flow generator including a fourth cavity defined in the substrate and in fluid communication with both the mixing zone and photolysis zone, the sheath flow generator including two sheath-flow inlet ports defined into the substrate and in fluid communication with the fourth cavity, the sheath-flow inlet ports and the fourth cavity configured to produce hydrodynamic focusing.

7. The opto-fluidic chip of claim 6 wherein the mixing zone is disposed in fluid communication between the sheath flow generator and the photolysis zone and the sheath flow generator is in fluid communication between the mixing zone and the third port.

8. The opto-fluidic chip of claim 6 wherein the sheath flow generator is disposed in fluid communication between the photolysis zone and the mixing zone and the mixing zone is in fluid communication between the sheath flow generator and both the second and third ports.

9. An opto-fluidic system for radical protein footprinting comprising:
    a chip including a substrate and a first port, a second port, and a third port each defined into the substrate, the chip further including
        a mixing zone comprising a first cavity defined within the substrate and in fluid communication with both the second and third ports, wherein mixing is performed within the first cavity,
        a photolysis zone comprising a second cavity defined within the substrate and in fluid communication with the mixing zone, the second cavity being bounded by first and second opposing transparent sides, the second cavity comprising a channel configured in a serpentine pattern, wherein photolysis is performed within the second cavity;
        a dosimetry zone comprising a third cavity defined within the substrate and in fluid communication with the photolysis zone and in further fluid communication with the first port, the third cavity being bounded by first and second opposing sides wherein one of the first and second sides of the third cavity is optically transparent, wherein contents of the third cavity are photometrically probed and wherein the photolysis zone is arranged between the mixing zone and the dosimetry zone; and
    a microfluidics system in fluid communication with both the second and third ports.

10. The system of claim 9 further comprising a reservoir configured to receive biological entities including oxidized biological compounds.

11. The system of claim 9 further comprising a light source configured to provide a light to the dosimetry zone.

12. The system of claim 9 further comprising a fluorescence light detector configured to receive fluorescent light emitted from within the dosimetry zone.

13. The system of claim 9 further comprising a light source configured to provide a coherent light to the dosimetry zone.

14. The system of claim 13 further comprising a scattered light detector configured to receive light scattered from within the dosimetry zone and in a direction orthogonal to a direction of the light from the light source.

15. The system of claim 13 further comprising a refractive index light detector configured to receive light scattered from within the dosimetry zone and in a direction orthogonal to a direction of the light from the light source.

16. The system of claim 9 wherein the chip further comprises a sheath flow generator including a fourth cavity defined in the substrate and in fluid communication with both the mixing zone and photolysis zone, the sheath flow generator including two sheath-flow inlet ports defined into the substrate and in fluid communication with the fourth cavity, the sheath-flow inlet ports and the fourth cavity configured to produce hydrodynamic focusing.

* * * * *